(12) United States Patent
Hagiwara

(10) Patent No.: US 8,024,654 B2
(45) Date of Patent: Sep. 20, 2011

(54) PROVIDING DEVICE USAGE INFORMATION THROUGH LAYOUT DIAGRAM

(75) Inventor: Kenji Hagiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1083 days.

(21) Appl. No.: 11/832,992

(22) Filed: Aug. 2, 2007

(65) Prior Publication Data

US 2008/0256486 A1 Oct. 16, 2008

(30) Foreign Application Priority Data

Sep. 14, 2006 (JP) .................................. 2006-249628

(51) Int. Cl.
*G06F 17/00* (2006.01)
(52) U.S. Cl. ........................................................ 715/243
(58) Field of Classification Search .................. 715/243, 715/211
See application file for complete search history.

(56) References Cited

U.S. PATENT DOCUMENTS

| | | | | |
|---|---|---|---|---|
| 5,752,185 A | * | 5/1998 | Ahuja ........................ | 455/414.1 |
| 5,757,900 A | * | 5/1998 | Nagel et al. ............... | 379/221.09 |
| 5,819,156 A | * | 10/1998 | Belmont ..................... | 725/14 |
| 6,115,580 A | * | 9/2000 | Chuprun et al. ........... | 455/1 |
| 6,802,007 B1 | * | 10/2004 | Canelones et al. ........ | 713/193 |
| 7,681,136 B2 | * | 3/2010 | Gennaro et al. ........... | 715/751 |
| 7,747,946 B2 | * | 6/2010 | Nelson et al. .............. | 715/243 |
| 2002/0180604 A1 | * | 12/2002 | Yamaashi et al. .......... | 340/573.1 |
| 2004/0162818 A1 | * | 8/2004 | Shaw .......................... | 707/3 |
| 2004/0205483 A1 | * | 10/2004 | Massarsky .................. | 715/500.1 |
| 2004/0230826 A1 | * | 11/2004 | Birkhoelzer et al. ....... | 713/200 |
| 2006/0085733 A1 | * | 4/2006 | Hirata ......................... | 715/501.1 |
| 2007/0050340 A1 | * | 3/2007 | von Kaenel et al. ....... | 707/3 |
| 2007/0052730 A1 | * | 3/2007 | Patterson et al. .......... | 345/634 |
| 2007/0073624 A1 | * | 3/2007 | Ishibashi et al. .......... | 705/53 |
| 2007/0130217 A1 | * | 6/2007 | Linyard et al. ............. | 707/201 |
| 2007/0143465 A1 | * | 6/2007 | Gonzalez et al. .......... | 709/223 |
| 2007/0201641 A1 | * | 8/2007 | Bar et al. ................... | 379/114.03 |
| 2007/0261008 A1 | * | 11/2007 | Seo et al. ................... | 716/1 |
| 2008/0066053 A1 | * | 3/2008 | Ramamoorthy et al. ... | 717/114 |
| 2008/0132201 A1 | * | 6/2008 | Karlberg .................... | 455/407 |
| 2008/0192294 A1 | * | 8/2008 | Reddy et al. ............... | 358/1.15 |
| 2008/0259818 A1 | * | 10/2008 | Balassanian ............... | 370/254 |

FOREIGN PATENT DOCUMENTS

JP 2004-70518 3/2004

OTHER PUBLICATIONS

Atterer et al., Knowing the User's Every Move—User Activitiy Tracking for Website Usability Evaluaation and Implicit Interaction, Google 2006, pp. 203-212.*
Luyten et al. Integrating UIML Task and Dialogs with Layout Patterns for Multi-Device User Interface Design, Google 2005, pp. 1-7.*

* cited by examiner

*Primary Examiner* — Cong-Lac Huynh
(74) *Attorney, Agent, or Firm* — Oblon, Spivak, McClelland, Maier & Neustadt, L.L.P.

(57) ABSTRACT

Layout data relating to layout of a user and a device is obtained. Log data relating to usage of the device, such as a job being performed or to be performed by the device, is obtained. A layout diagram illustrating the layout of the user and the device is generated based on the layout data. Line data to be additionally included in the layout diagram is generated based on the log data.

17 Claims, 17 Drawing Sheets

FIG. 4

| DEVICE NAME | STATUS | IP ADDRESS | MAC ADDRESS | FLOOR | ICON |
|---|---|---|---|---|---|
| Printer_A | ready | xxx.xxx.xxx.1 | xx : xx : xx : xx : xx : 01 | 1F | prn.gif |
| Printer_B | ready | xxx.xxx.xxx.2 | xx : xx : xx : xx : xx : 02 | 1F | prn.gif |
| Scanner_A | busy | xxx.xxx.xxx.3 | xx : xx : xx : xx : yy : xx : 03 | 1F | scn.gif |
| Fax_A | ready | xxx.xxx.xxx.4 | xx : xx : xx : xx : zz : xx : 04 | 1F | fax.gif |
| MFP_A | busy | xxx.xxx.xxx.5 | xx : xx : xx : xx : ww : xx : 05 | 1F | mfp.gif |
| Printer_C | busy | xxx.xxx.yyy.6 | xx : xx : xx : xx : xx : 06 | 2F | prn.gif |
| ... | ... | ... | ... | ... | ... |

FIG. 5

| MAP NAME | BACKGROUND IMAGE | OBJECT | LOCATION |
|---|---|---|---|
| 1F | 1stFloor.gif | Printer_A | (10, 10) |
| | | Printer_B | (200, 100) |
| | | Scanner_A | (100, 400) |
| | | Fax_A | (500, 500) |
| | | MFP_A | (300, 50) |
| | | user_A | (200, 250) |
| | | user_B | (400, 100) |
| | | user_C | (300, 300) |
| 2F | 2ndFloor.gif | ⋮ | ⋮ |
| ⋮ | ⋮ | ⋮ | ⋮ |

FIG. 6

| USER NAME | EMAIL | ICON | ACCESS LEVEL | PASSWORD |
|---|---|---|---|---|
| user_A | aaa@example.com | usr.gif | GENERAL USER | ******** |
| user_B | bbb@example.com | usr.gif | GENERAL USER | ******** |
| user_C | ccc@example.com | usr.gif | ADMINISTRATOR | ******** |
| ⋮ | ⋮ | ⋮ | ⋮ | ⋮ |

FIG. 7

| DEVICE NAME | USER NAME | NO. OF PAGES | JOB TYPE | TIME |
|---|---|---|---|---|
| Printer_A | user_B | — | COLOR PRINTING STARTED | May 20 01:23:45 2006 GMT |
| Printer_A | user_B | 3 | COLOR PRINTING END | May 20 01:23:54 2006 GMT |
| Scanner_A | user_A | — | SCAN STARTED | May 20 01:32:10 2006 GMT |
| MFP_A | user_C | — | MONOCHROME PRINTING STARTED | May 20 01:32:11 2006 GMT |
| Scanner_A | user_A | 5 | SCAN END | May 20 01:32:20 2006 GMT |
| MFP_A | user_C | 20 | MONOCHROME PRINTING END | May 20 01:33:22 2006 GMT |
| ... | ... | ... | ... | ... | ically or intuitively obtain the desired information from the log data without editing.

PROVIDING DEVICE USAGE INFORMATION THROUGH LAYOUT DIAGRAM

CROSS-REFERENCE TO RELATED APPLICATIONS

This patent application is based on and claims priority under 35 U.S.C. §119 to Japanese Patent Application No. 2006-249628, filed on Sep. 14, 2006, in the Japanese Patent Office, the disclosure of which is incorporated herein in its entirety by reference.

FIELD OF THE INVENTION

Example embodiments of the present invention relate to an apparatus, system, method, and computer program and product each capable of providing information regarding the usage of a device through a layout diagram of the device.

BACKGROUND

In today's network environment, one or more users are connected to one or more devices via a network such that any one of the devices is capable of performing one or more jobs according to a request received from any one of the users. In order to manage a plurality of jobs performed by each device, a device management apparatus may be usually provided. For example, the device management apparatus may manage log data indicating a plurality of jobs performed by each device to analyze the usage of the plurality of devices, such as the number of jobs performed by a specific device within a predetermined time period or the number of jobs requested by a specific user within a predetermined time period.

In such case, the log data is usually provided in the form of table storing information regarding a job performed by a specific device according to a request received from a specific user. For this reason, the user is often required to edit the log data, for example, by sorting the log data or creating a graph using the log data, in order to obtain desired information from the log data. The inventor of the present invention realized that there was an increasing need for providing log data in a manner such that the user may visually or intuitively obtain the desired information from the log data without editing.

SUMMARY

Example embodiments of the present invention include an apparatus, method, system, computer program and product each capable of providing information regarding the usage of a device through a layout diagram of the device.

In one example, a method of providing log data through a layout diagram may be provided, which includes: obtaining layout data relating to layout of a user and a device; generating the layout diagram illustrating the layout of the user and the device based on the layout data, the layout diagram including a user object representing the user and a device object representing the device; obtaining the log data relating to usage of the device by the user; and generating line data using a selected portion of the log data, the line data to be additionally included in the layout diagram as a line object connecting the user object and the device object.

In another example, a layout diagram generating apparatus may be provided, which includes means for obtaining data, means for generating a layout diagram, and means for generating line data. The data obtained by the means for obtaining data includes layout data relating to layout of a user and a device and log data relating to a job performed by or to be performed by the device. The layout diagram, which is generated by the means for generating the layout diagram based on the layout data, includes a user object representing the user and a device object representing the device. The line data, which is generated by the means for generating the line data based on the log data, may be additionally included in the layout diagram as a line object connecting the user object and the device object.

In addition to the above-described example embodiments, the present invention may be practices in various other ways, for example, as a recording medium storing a plurality of instructions for causing a general-purpose computer to perform the above-described method or function as the above-described layout diagram generating apparatus, or a system including the above-described layout diagram generating apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is an example table storing various information to be managed as device data;

FIG. 5 is an example table storing various information to be managed as layout data;

FIG. 6 is an example table storing various information to be managed as user data;

FIG. 7 is an example table storing various information to be managed as log data;

Figure 1:
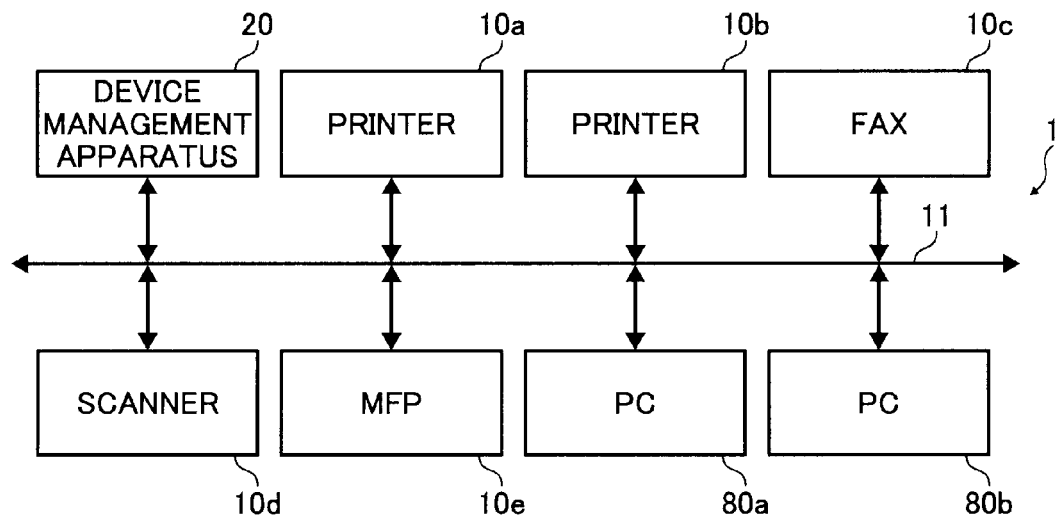
FIG. 1 is a schematic block diagram illustrating the structure of a device management system including a device management apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 illustrates a device management system 1 including a device management apparatus 20 according to an example embodiment of the present invention.

The device management system 1 additionally includes a plurality of devises to be managed by the device management apparatus 20 including a printer 10a, printer 10b, facsimile (FAX) 10c, scanner 10d, and multifunctional device (MFP) 10d, which may be collectively referred to as the "device" 10, 10d, and a plurality of client apparatuses including a personal computer (PC) 80a and a PC 80b, which may be collectively referred to as the "client" 80. The device management apparatus 20, the device 10, and the client 80 are connected via a network 11. The network 11 may be implemented by any desired network including, for example, a local area network (LAN). Through the network 11, a user at the client 80 may request the device 10 to perform one or more jobs.

The device management apparatus 20, which may be implemented by any desired kind of information processing apparatus, may obtain various information including information regarding the device 10 ("device data"), information relating to the layout of the device 10 and/or the user ("layout data"), information relating to a job performed by the device 10 ("log data"), or information regarding the client 80 or the user ("user data"). In addition to allowing the user to send a request to the device 10, the client 80, which may be implemented by any desired kind of information processing apparatus, may allow the user to access the device management apparatus 20 to obtain any desired information regarding the usage of the device 10. For example, upon receiving a request from the user through the client 80 for displaying information regarding the usage of the device 10, the device management apparatus 20 may provide information regarding the usage of the device 10 through a layout diagram illustrating the layout of the device and the user. For this reason, in this specification, the user and the client 80 may be used interchangeably.

Figure 2:
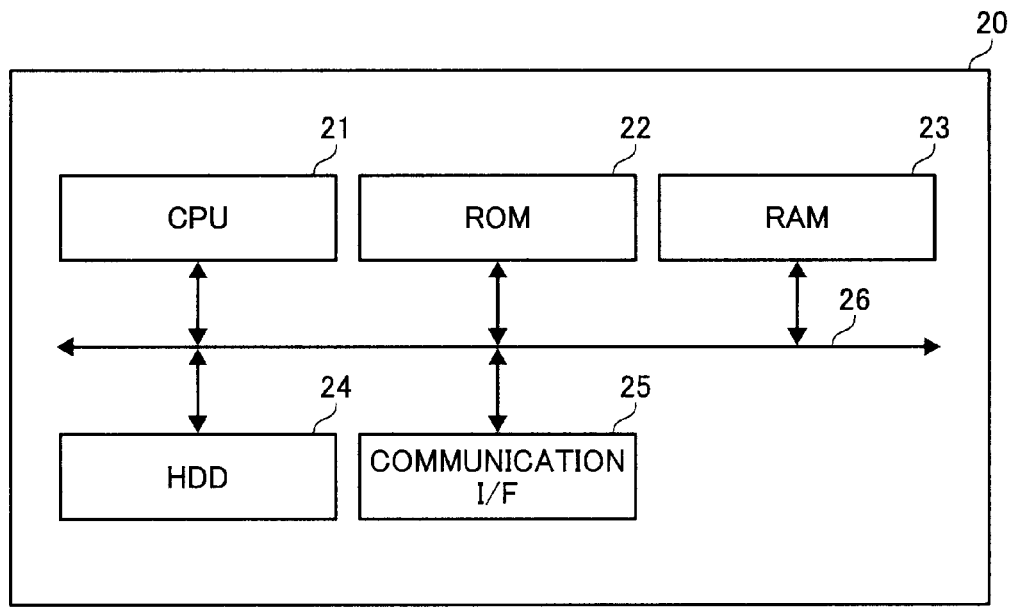
FIG. 2 is a schematic block diagram illustrating the hardware structure of the device management apparatus shown in FIG. 1 according to an example embodiment of the present invention.

Referring now to FIG. 2, the hardware structure of the device management apparatus 20 is explained according to an example embodiment of the present invention. The device management apparatus 20 includes a central processing unit (CPU) 21, a read only memory (ROM) 22, a random access memory (RAM) 23, a hard disk drive (HDD) 24, and a communication interface (I/F) 25, which are connected via a system bus 26.

The CPU 21 may control operation of the device management apparatus 20 according to a device management program, which may be loaded onto the RAM 23 from the ROM 22 or the HDD 24. Alternatively, the device management program may be downloaded from any other device through the communication I/F 25, or from any other recording medium accessible by the device management apparatus 20. The ROM 22 may be implemented by a nonvolatile memory capable of storing data. The RAM 23 may function as a work memory of the CPU 21. The HDD 24 may be implemented by a storage capable of storing data. The communication I/F 25 allows the device management apparatus 20 to connect to the network 11.

The hardware structure of the device management apparatus 20 is not limited to the hardware structure shown in FIG. 2. For example, an output device capable of outputting a layout diagram, such as a display device, may be additionally provided. In such case, a browser program may be additionally stored in the ROM 22 or the HDD 24. In another example, an input device capable of inputting an instruction from the user may be additionally provided. In another example, the device management apparatus 20 may be incorporated into any one of the device 10 or any other device to be managed by the device management apparatus 20.

Figure 3:
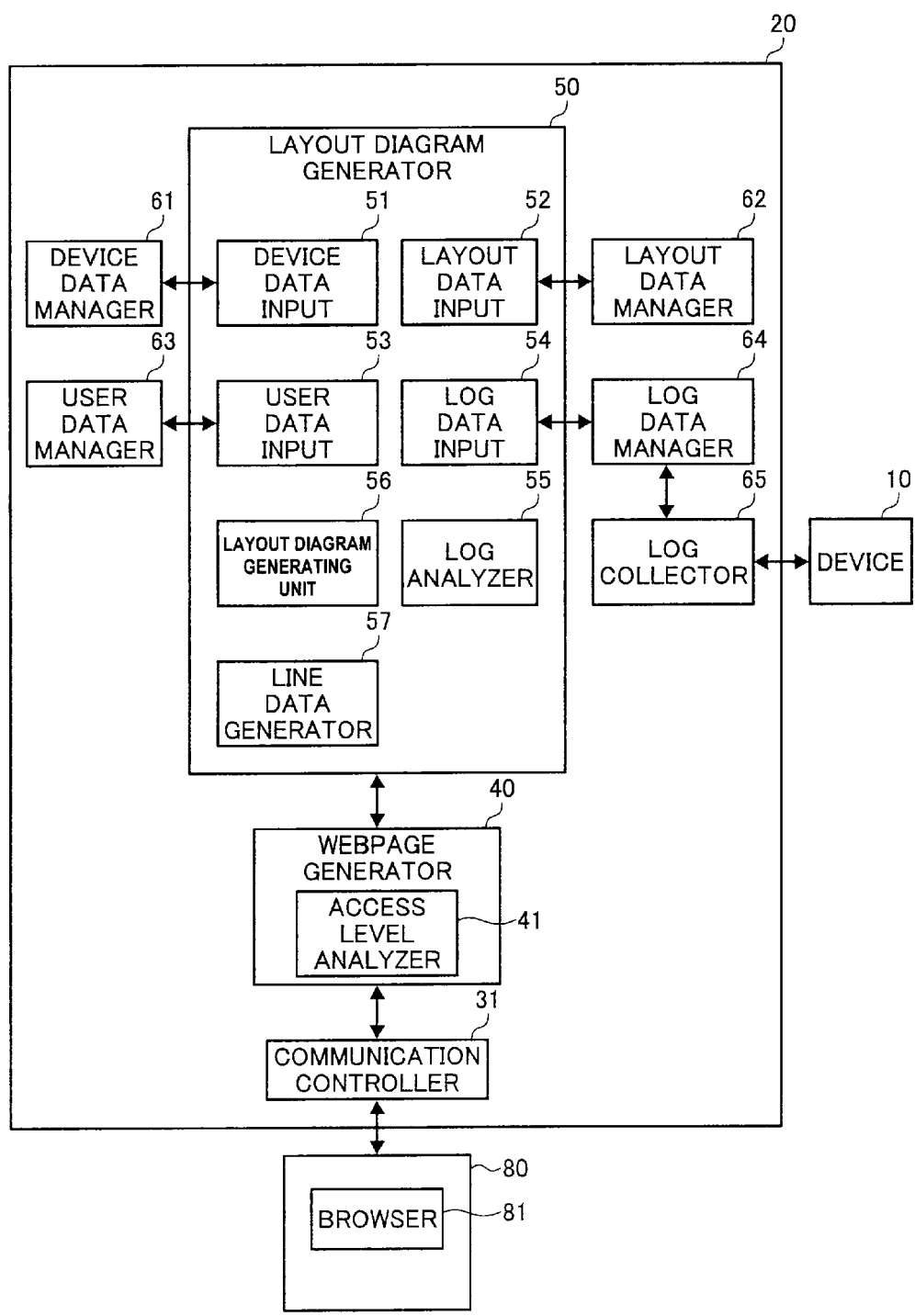
FIG. 3 is a schematic block diagram illustrating the functional structure of the device management apparatus shown in FIG. 1 according to an example embodiment of the present invention.

Referring now to FIG. 3, the functional structure of the device management apparatus 20 is explained according to an example embodiment of the present invention. The functional structure shown in FIG. 3 corresponds to the function of generating a layout diagram, which is one of the functions to be provided by the device management apparatus 20, according to the device management program, or a portion of the device management program. The portion of the device management program having the function of generating the layout diagram may be initially provided integrally with the device management program. Alternatively, the portion of the device management program having the function of generating the layout diagram may be initially provided separately from the device management program. Further, in this example, the device management apparatus 20 provides information regarding the usage of the device 10 ("device usage information") through a layout diagram, according to the device management program, or a portion of the device management program. In this example, the layout diagram corresponds to any illustration showing the layout of the device 10 and the user. For example, in the example case of a layout diagram of the device management system of FIG. 1, the layout diagram may be generated as a device map showing the physical locations of the printer 10a, printer 10b, fax 10c, scanner 10d, MFP 10e, PC 80a, and PC 80b. In the layout diagram, each device 10 is expressed as a device object, while each user, or each client 80, is expressed as a user object. Further, in this example, the device usage information may be expressed in the form of line data, which may be additionally included in the layout diagram as a line object connecting the device object and the user object. The line data may be added automatically at the time of displaying the layout diagram or added to the layout diagram upon receiving a user request.

Referring to FIG. 3, the device management apparatus 20 includes a communication controller 31, a webpage generator 40, a layout diagram generator 50, a device data manager 61, a layout data manager 62, a user data manager 63, a log data manager 64, and a log collector 65.

The communication controller 31 allows the device management apparatus 20 to communicate with the outside apparatus, such as the client 80. For example, the communication controller 31 may be implemented by a HyperText Transfer Protocol (HTTP) daemon. In one example, upon receiving a request from a browser 81 of the client 80 for displaying a layout diagram, the communication controller 31 sends the request to the webpage generator 40. The communication controller 31 receives webpage data including the layout diagram from the webpage generator 40, and sends the webpage data to the browser 81 of the client 80 in response to the request.

The webpage generator 40 generates webpage data upon receiving the request from the browser 81 of the client 80 through the communication controller 31. For example, when the request requests for displaying the layout diagram, the webpage generator 40 may generate the webpage data including the layout diagram, which may be obtained from the layout diagram generator 50.

The device data manager 61 manages various information regarding the device 10 as the device data.

The layout data manager 62 manages various information regarding the layout of the device 10 or the user as the layout data. The layout data may include, for example, information regarding a background image describing an environment in which the device 10 is provided, information regarding the physical location of the device 10 or the user, etc.

The user data manager 63 manages various information regarding the user as the user data. The user data may include, for example, information regarding identification information of a plurality of users who has registered to access the device management apparatus 20.

The log data manager 64 manages various information regarding one or more jobs being performed or to be performed by the device 10 as the log data, which may be obtained from the device 10 through the log collector 65. The log collector 65 obtains log data by accessing the device 10, for example, upon notification received from the device 10 or at predetermined timing, and registers the log data in the log data manager 64.

The layout diagram generator 50 may be implemented by a front end program capable of providing a user interface. Upon receiving the request for displaying a layout diagram from the webpage generator 40, the layout diagram generator 50 collects various data from at least one of the managers 61 to 64, edits the various data as needed, and generates a layout diagram using the various data to be sent to the webpage generator 40. In this example, the layout diagram generator 50 includes a device data input 51, a layout data input 52, a user data input 53, a log data input 54, a log analyzer 55, a layout diagram generating unit 56, and a line data generator 57.

The device data input 51 obtains the entire or a selected portion of the device data from the device data manager 61. The layout data input 52 obtains the entire or a selected portion of the layout data from the layout data manager 62. The user data input 53 obtains the entire or a selected portion of the user data from the user data manager 63. The log data input 54 obtains the entire or a selected portion of the log data from the log data manager 64.

The layout diagram generating unit 56 generates a layout diagram, such as a device map, by adding a device object representing the device 10 and a user object representing the user, i.e., the client 80 to a background image illustrating the environment in which the device 10 is provided. The device object or the user object may be displayed in the form of icon, mark, picture, text, etc., which may be set by default or according to the user preference. Once the layout diagram is generated, the layout diagram generating unit 56 may send the layout diagram to the webpage generator 40.

The log analyzer 55 analyzes the log data input by the log data input 54 to generate line data to be included in the layout diagram. In one example, upon receiving a request for displaying a layout diagram, the log analyzer 55 selects the entire or a portion of the log data input by the log data input 54, which relates to the device 10 and the user to be included in the layout diagram, and sends the selected portion of the log data to the line data generator 57. In another example, upon receiving a user input for selecting one device from the device 10 displayed in the layout diagram as a selected device, the log analyzer 55 selects a portion of the log data, which relates to the selected device, and sends the selected portion of the log data to the line data generator 57. In another example, upon receiving a user input for selecting one user from the user displayed in the layout diagram as a selected user, the log analyzer 55 selects a portion of the log data, which relates to the selected user, and sends the selected portion of the log data to the line data generator 57. In another example, upon receiving user information from the user, the log analyzer 55 selects a portion of the log data input by the log data input 54, which may be accessed by the user providing the user information, and sends the selected portion of the log data to the line data generator 57.

The line data generator 57 generates line data based on the log data, such as the selected portion of the log data selected by the log analyzer 55. Assuming that the layout diagram corresponds to the example case of the system of FIG. 1, in one example, the line data may include information regarding one or more jobs performed by at least one of the printer 10a, printer 10b, fax 10c, scanner 10d, and MFP 10e, according to one or more requests received from at least one of the PC 80*a* and PC 80*b*. In another example, the line data may include information regarding one or more jobs performed by at least one of the printer 10*a*, printer 10*b*, fax 10*c*, scanner 10*d*, and MFP 10*e*, according to one or more requests received from a selected one of the PC 80*a* and PC 80*b*. The selected one of the PC 80*a* and PC 80*b* may be determined according to a user input. In another example, the line data may include information regarding one or more jobs performed by a selected one of the printer 10*a*, printer 10*b*, fax 10*c*, scanner 10*d*, and MFP 10*e*, according to one or more requests received from at least one of the PC 80*a* and PC 80*b*. The selected one of the printer 10*a*, printer 10*b*, fax 10*c*, scanner 10*d*, and MFP 10*e* may be determined according to a user input. In another example, the line data may include one or more jobs performed for a predetermined time period. In another example, the line data may include one or more jobs belonging to a specific job type. In another example, the line data may include one or more jobs that may be accessed by a specific user. Once the line data is generated, the line data generator 57 may send the line data to the webpage generator 40.

The webpage generator 40 generates webpage data including the layout diagram received from the layout diagram generating unit 56. At this time, the webpage generator 40 may additionally receive the line data from the line data generator 57, and add the line data to the layout diagram as a line object connecting the user object and the device object to generate webpage data including the layout diagram to which the line object is added. The line object may be displayed in the form of a line connecting the user object and the device object. The webpage data is then sent to the browser 81 of the client 80 through the communication controller 31 for display to the user.

Using one or more devices described above, the device management apparatus 20 is capable of providing the device usage information through a layout diagram of the device 10 for display to the user. Since the device usage information is illustrated as a line object, the user may visually or intuitively obtain desired information regarding the usage of the device 10 without the need for editing. For example, when the line object connecting the device object representing the printer 10*a* and the user object representing the PC 80*a* is shown in the layout diagram, the user may visually or intuitively recognize that the printer 10*a* has been or is to be used by the PC 80*a*. Further, the line data generator 57 may change the appearance of the line object in a corresponding manner according to the type of jobs being performed or the number of jobs being performed such that the user may visually or intuitively obtain information regarding the type or the number of jobs being performed or to be performed by the device 10 through the layout diagram.

Still referring to FIG. 3, the webpage generator 40 may be provided with an access level analyzer 41. The access level analyzer 41 obtains user data from the user data manager 63, and determines an access level of the user who sends the request for displaying information regarding the usage of the device 10. Based on the access level, the access level analyzer 41 may cause the layout diagram generator 50 to determine whether to additionally include the line data in the layout diagram as a line object, or which of the line data to be included in the layout diagram as a line object. Alternatively, the access level analyzer 41 may cause the webpage generator 40 to undisplay the line object based on the access level of the user. For example, when the user is an administrator who has access to device usage information for all devices and all users, the access level analyzer 41 may cause the layout diagram generator 50 to include all line data for display or cause the webpage generator 40 to display all line objects. When the user is a general user who has access to device usage information that can be accessed by the user, the access level analyzer 41 may cause the layout diagram generator 50 to only include the line data that the user is authorized to access or cause the webpage generator 40 to display only the line objects that the user is authorized to view.

The functional structure of the device management apparatus 20 is not limited to the functional structure shown in FIG. 3. For example, any one of the data managers 61 to 64 may be provided outside of the device management apparatus 20 as long as the layout diagram generator 50 is capable of obtaining data to be used for generating a layout diagram. For example, any one of the data managers 61 to 64 may be implemented by a web service capable of communicating with the layout diagram generator 50, which may be implemented by the front end program, using the Simple Object Access Protocol (SOAP). In such case, the log collector 65 may be provided outside of the device management apparatus 20.

In another example, the device management apparatus 20 may be additionally provided with a browser, which functions in a substantially similar manner as the browser 81 of the client 80. In such case, the device management apparatus 20 may display the layout diagram directly to the user.

Referring to FIG. 4, examples of the device data are explained. The device data may include information regarding a device name, status, Internet Protocol (IP) address, media access control (MAC) address, floor in which the device is located, and icon representing each device for the device 10. Additionally, the device data may include any other kind of information, such as a device type of the device 10.

As the information regarding the device name, a name of the device 10, which may be uniquely assigned to identify the device 10 may be stored. The device name may be replaced by the device type, as long as each device can be uniquely identified using the device type, or using the device type together with any other information of the device data such as the IP address.

As the information indicating the status, the current status of the device 10, which may be obtained from the device 10 at predetermined timing may be stored. For example, the status may be set to "ready" when the device 10 is in the idle state waiting for a job. The status may be set to "busy" when the device 10 is performing a job. The status may be set to "alert" when an error is detected in the device 10.

As the information regarding the IP address, an IP address uniquely assigned to the device 10 to allow communication via the network 11 may be stored.

As the information regarding the MAC address, a MAC address assigned to, for example, a network adaptor such as a network card of the device 10 may be stored. The network adaptor or card may correspond to the communication I/F 25 of FIG. 2 or the communication controller 31 of FIG. 3.

As the information regarding the floor, the level of the floor in which the device 10 is located may be stored. In this example, the system illustrated in FIG. 1 is assumed to be provided on the first floor of a building as illustrated in FIG. 4. In addition to the system illustrated in FIG. 1, a system similar to the system of FIG. 1 may be each provided in one or more floors other than the first floor of the same building. Further, in this example, a layout diagram may be prepared for each one of the floors of the building using corresponding one of the background images provided for each one of the floors of the building. The information regarding the floor may be thus used to specify the background image to be used when generating the layout diagram.

In alternative to preparing a layout diagram for each one of the floors, the layout diagram may be prepared by room, network, or building. In such case, the information regarding the floor may be replaced by information regarding the room, network, or building.

As the information regarding the icon, the name of a file storing the image data of an icon representing each device may be stored. In addition or alternative to the file name, information regarding a path to the file may be stored. The icon may be automatically assigned by the device management apparatus 20, or manually set by the user. Alternatively, the information regarding the icon may be replaced by information regarding the form of the device object, when the device object is set to be displayed in any other form.

The device data may be automatically set by the device management apparatus 20 using information obtainable from the device 10. Alternatively, the device data may be manually set by the user. For example, in the example case of inputting information regarding the floor, the user may manually input the level of the floor by visually checking the physical location of the device 10. Alternatively, the device management apparatus 20 may automatically store information regarding the floor using information such as the network address of the device 10, if such information can specify the floor in which the device 10 is located.

Referring to FIG. 5, examples of the layout data, which relates to one or more layout diagrams to be generated by the device management apparatus 20, are explained. In this example, the device management apparatus 20 generates one or more device maps for the respective levels of floor. The layout data may include information regarding a map name of the device map, background image to be used for generating the device map, object to be included in the device map, and location of each object to be included in the device map.

As the information regarding the map name, a name uniquely assigned to a file storing image data of the device map may be stored. In this example, the map name of the device map for the first floor is assigned with the name "1F".

As the information regarding the background image, a name uniquely assigned to a file storing the background image to be used for generating the device map may be stored. Alternatively or additionally, information regarding a path to the file storing the background image may be stored.

As the information regarding the object, identification information, such as the device name, of the device object to be included in the device map may be stored. In addition, identification information, such as a user name, of the user to be included in the device map may be stored. In the example case of the device map "1F" illustrating the layout of the system of FIG. 1 located on the first floor, the objects respectively representing the printer 10a having the device name "Printer_A", the printer 10b having the device name "Printer_B", the scanner 10d having the device name "Scanner_A", the FAX 10c having the device name "Fax_A", and the MFP 10e having the device name "MFP_A" are provided as a device object to be included in the device map "1F". The objects respectively representing the PC 80a having the user name "user_A", and the PC 80b having the user name "user_B" are provided as a user object to be included in the device map "1F".

As the information regarding the location of the object, coordinate values indicating the physical location of the object to be included in the device map may be stored.

In addition to the information illustrated in FIG. 5, the layout data may additionally include information regarding the floor in a corresponding manner with information regarding the map name. The layout data may be manually set by the user. For example, the information regarding the object or the location of the object to be included in the device map may be manually input by the user. Alternatively, the layout data may be automatically set by the device management apparatus 20. For example, the information regarding the map name or the background image may be set by default using the information regarding the floor in which the object to be included in the device map is located. In another example, the information regarding the location of the user object may be set automatically by the device management apparatus 20, upon receiving location data from the client 80 that the user is logged on. For example, when the client 80 is implemented by a device capable of sending the location data, which may be obtained by a global positioning system (GPS) receiver, the device management apparatus 20 may store the location data as the information indicating the location of the user.

Referring to FIG. 6, examples of the user data are explained. The user data may include information regarding a user name, email address, icon, access level, and password of the user who may access the device management apparatus 20 through the client 80.

As the information regarding the user, a user name uniquely assigned to identify the user may be stored. For example, the user name to be used by the user to log onto the system of the client 80 may be used. Alternatively, when the client 80 is only used by a specific user, a device name assigned to the client 80 may be used as the user name.

As the information regarding the email address, an email address of the user may be stored. The email address may be used in replace of the user name identifying the user.

As the information regarding the icon, the name of a file storing the image data of an icon representing the user may be stored. In addition or alternative to the file name, information regarding a path to the file may be stored. The icon may be automatically assigned by the device management apparatus 20, or manually set by the user. Alternatively, the information regarding the icon may be replaced by information regarding the form of the device object, when the device object is set to be displayed in any other form.

As the access level information, information regarding an access level of the user may be stored. In this example, the user may be classified into two user groups: a general user group having a low access level, and an administrator group having a high access level. Alternatively, the access level may be set independently for each user or device.

As the information regarding the password, a password of the user, which has been registered in a corresponding manner with the user name, may be stored. Alternatively, any other information that may be used to authenticate the user or analyze the access level of the user may be stored, such as a digital certificate.

Referring to FIG. 7, examples of the log data are explained. The log data may include information regarding a device name performing each job, a user name requesting each job, number of pages being processed for each job, type of each job, and time each job is started or completed. As described above referring to FIG. 3, the log data of FIG. 7 may be collected from each device of the device 10.

As the information regarding the device name, a name of the device 10 performing the job may be stored. The device name may correspond to the device name shown in FIG. 4.

As the information regarding the user name, a name of the user requesting the job may be stored. The user name may be correspond to the user name shown in FIG. 6.

As the information regarding the number of pages, the number of pages being processed by the device 10 for performing the job may be stored. For example, when the job is processed by the printer 10a or printer 10b, the number of printed pages is stored. When the job is processed by the fax 10c, the number of faxed pages is stored. When the job is processed by the scanner 10d, the number of scanned pages is stored. When the job is processed by the MFP 10e, the number of pages being printed, faxed, scanned, distributed via the network 11, or stored in the MFP 10e may be stored.

As the information regarding the type of the job, the type of the job being performed by the device 10 may be stored. As illustrated in FIG. 7, the job type information may indicate whether the job corresponds to a printing job being performed by the printer 10a or 10b, a fax job being performed by the FAX 10c, a scan job being performed by the scanner 10d, and any one of the above-described image forming jobs or image processing jobs performed by the MFP 10e. Additionally, the job type information may indicate the status of the job being performed, such as whether the job is started or completed. Although not shown in FIG. 7, the status of the job may indicate whether the job is being held to be processed, or whether the job is interrupted or cancelled due to an error. Additionally or alternatively, the status of the job may indicate the order of the job to be performed. Additionally, the job type information may indicate whether the job corresponds to a job processing a color image or a job processing a monochrome image.

As the information regarding the time of the job, a date and time indicating when the job is performed may be stored, which may be obtained by a timer provided in the device 10. For example, the time information may indicate the date and time when processing of the job is started. In another example, the time information may indicate the date and time when processing of the job is completed. In another example, the time information may indicate the date and time when the job is interrupted or cancelled, for example, due to an error. In another example, the time information may indicate the date and time when a request for performing the job is sent by the user or received by the device 10. In another example, the time information may indicate the date and time when completion of the job is notified to the user.

Figure 8:
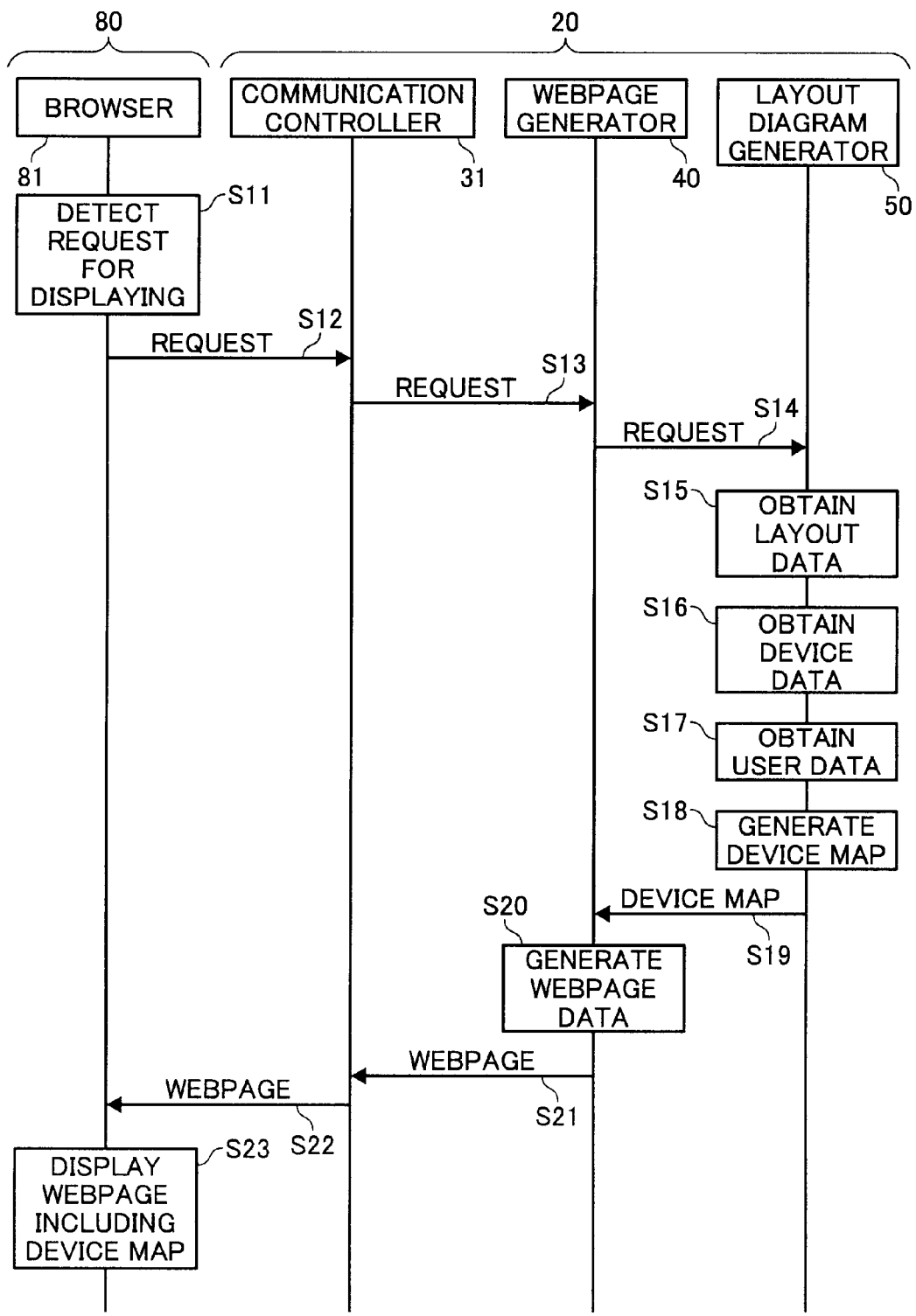
FIG. 8 is a sequence diagram illustrating operation of generating a layout diagram according to an example embodiment of the present invention.

Referring to FIG. 8, operation of generating a device map, performed by the device management apparatus 20 upon receiving a request from the user through the browser 81, is explained according to an example embodiment of the present invention.

At S11, the browser 81 detects a request for displaying a device map received from the user. The request for displaying may specify an area, such as the level of a floor, to be displayed as the device map, which may be determined according to a user input. Alternatively, the browser 81 may automatically specify an area, such as the level of a floor, using user information, such as the user name, input by the user, for example, when the user is logged onto the system of the client 80. Specifically, the device map including the user object representing the logged user may be automatically selected for display.

At S12, the browser 81 sends the request for displaying the device map to the device management apparatus 20.

At S13, the communication controller 31 of the device management apparatus 20 sends a request for obtaining the device map to the webpage generator 40.

At S14, the webpage generator 40 sends the request for obtaining the device map to the layout diagram generator 50.

Figure 10:
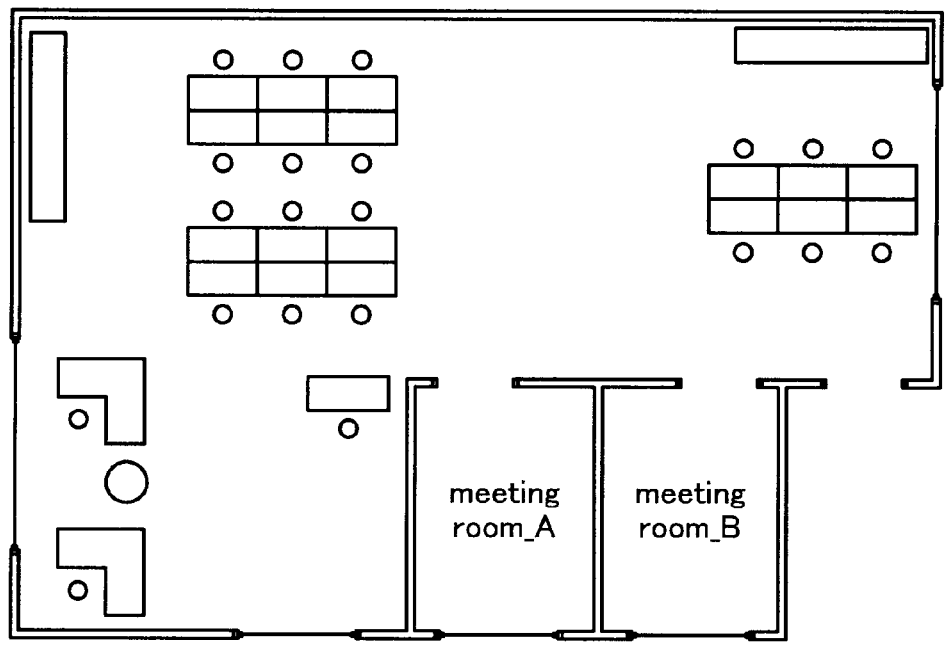
FIG. 10 is an illustration of an example background image to be used for generating a layout diagram.

Upon receiving the request, at S15, the layout diagram generator 50 obtains layout data, which may be used to generate the device map, from the layout data manager 62. As illustrated in FIG. 5, the layout data may include information regarding the background image to be used for generating the device map of the specified area, such as the name of the background image. Once the name of the background image is specified, the background image may be obtained from an internal memory of the device management apparatus 20 or outside of the device management apparatus 20. In this example, the background image shown in FIG. 10, which illustrates the floor plan of the specified area, may be obtained. In addition to the background image, the layout diagram generator 50 may obtain information regarding the user object and the device object to be included in the device map such as the device name, user name, and location of the device or user.

At S16, the layout diagram generator 50 obtains device data of a device, which may be included as the device object in the device map, from the device data manager 61. For example, information regarding the icon, which may be used as the device object representing the device may be obtained using the device name obtained at S15.

At S17, the layout diagram generator 50 obtains user data of a user, which may be included as the user object in the device map, from the user data manager 63. For example, information regarding the icon, which may be used as the user object representing the user may be obtained using the user name obtained at S15.

Figure 11:
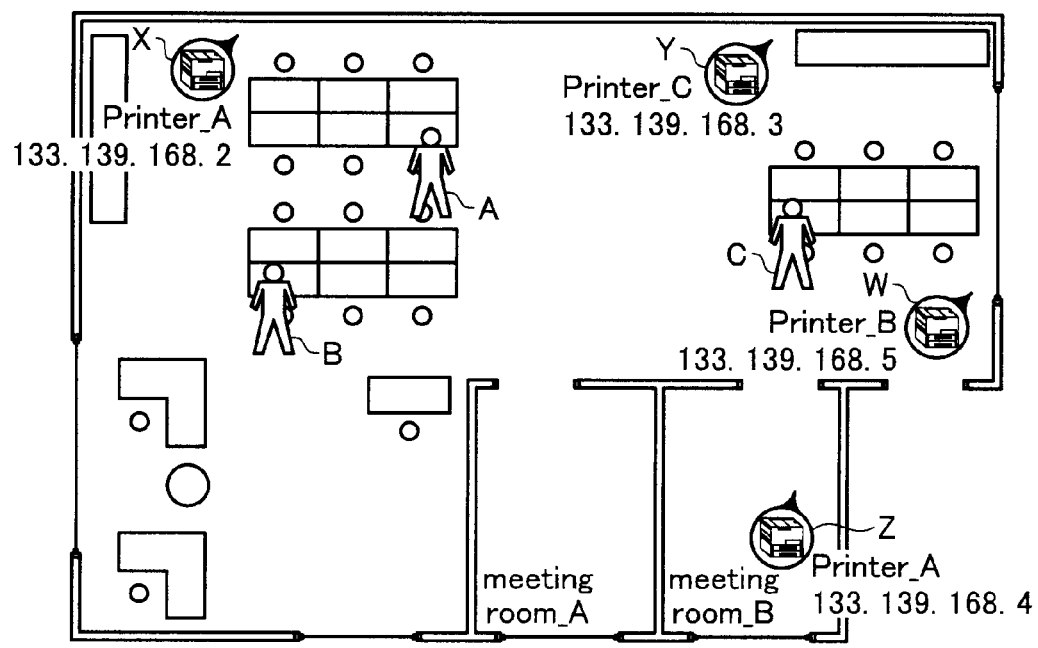
FIG. 11 is an illustration of an example layout diagram generated using the background image of FIG. 10.

At S18, the layout diagram generator 50 generates the device map, for example, by placing the device object and the user object at specified locations of the background image. In this example, as illustrated in FIG. 11, a plurality of icons X, Y, Z, W, A, B, and C are obtained as an object to be added to the background image of FIG. 10. The icon X corresponds to the device object representing a printer 10x having the device name "Printer_A". The icon Y corresponds to the device object representing a printer 10y having the device name "Printer_C". The icon Z corresponds to the device object representing a printer 10z having the device name "Printer_A". The icon W corresponds to the device object representing a printer 10w having the device name "Printer_B". The icon A corresponds to the user object representing a user A having the user name "user_A". The icon B corresponds to the user object representing a user B having the user name "user_B". The icon C corresponds to the user object representing a user C having the user name "user_C". In addition to the icons, any other information regarding the device may be included in the device map, including, for example, the name of the device, the type of the device, or the IP address of the device. Additionally, any other information regarding the user may be included, including, for example, the name of the user.

At S19, the device map generator 50 sends the device map to the webpage generator 40.

At S20, the webpage generator 40 generates webpage data including the device map.

At S21, the webpage generator 40 sends the webpage data to the communication controller 31.

At S22, the communication controller 31 sends the webpage data to the browser 81 of the client 80 in response to the request for displaying the device map.

At S23, the browser 81 displays the webpage data including the device map. For example, the device map illustrated in FIG. 11 may be displayed.

Figure 9:
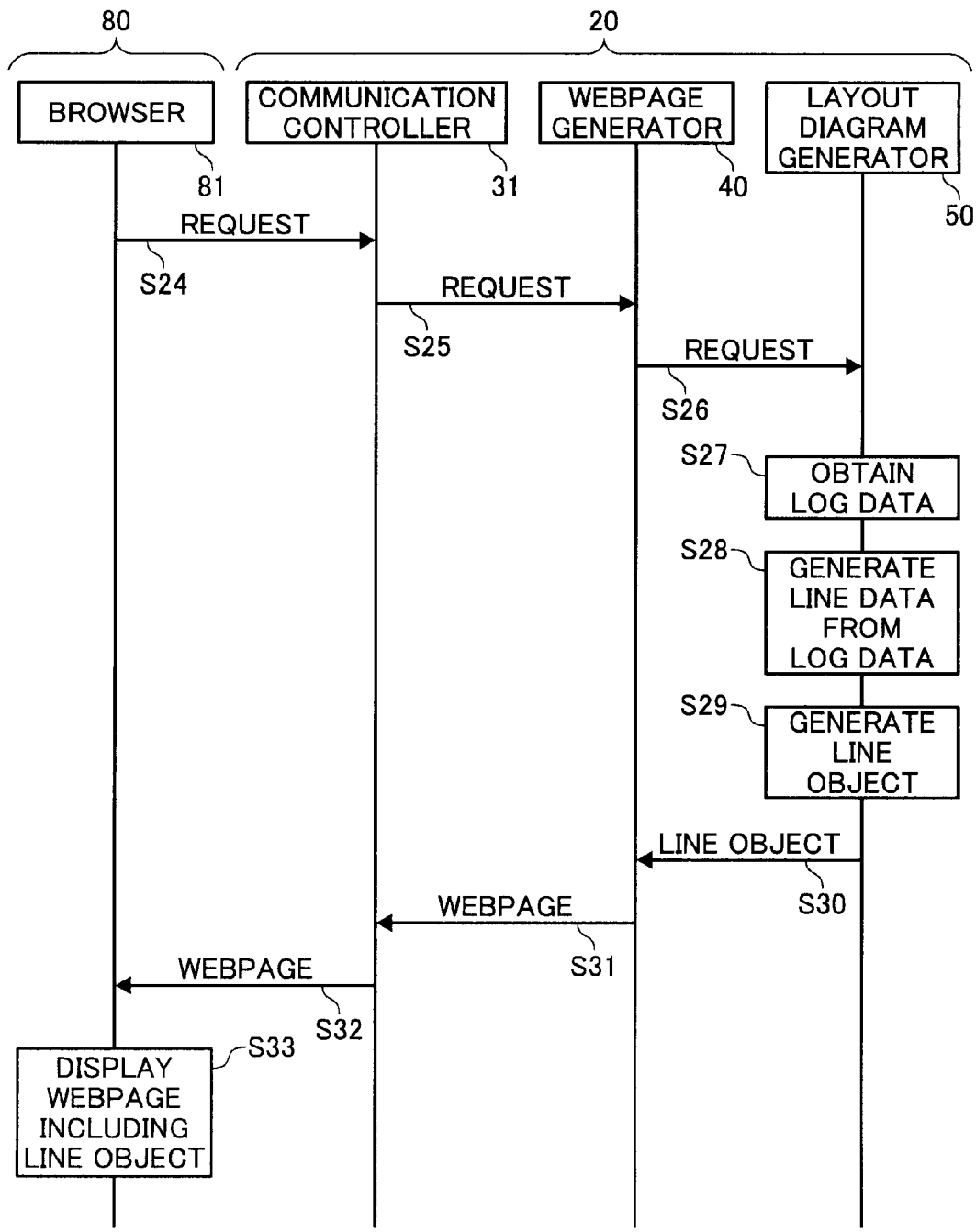
FIG. 9 is a sequence diagram illustrating operation of adding a line object to the layout diagram generated by performing the operation of FIG. 8, according to an example embodiment of the present invention.

Once the device map is displayed, the user may further request the device management apparatus 20 to additionally display information regarding the usage of any one of the devices shown in the device map. As described above referring to FIG. 2 or 3, information regarding the usage of the device may be added to the device map as a line object. Referring now to FIG. 9, operation of adding a line object to the device map, performed by the device management apparatus 20, upon receiving a request from the user through the browser 81, is explained according to an example embodiment of the present invention.

At S24, upon detecting a request for displaying a line object received from the user, the browser 81 sends the request for displaying the line object to the device management apparatus 20.

At S25, the communication controller 31 of the device management apparatus 20 sends a request for obtaining the line object to the webpage generator 40.

At S26, the webpage generator 40 sends the request for obtaining the line object to the layout diagram generator 50.

Upon receiving the request, at S27, the layout diagram generator 50 obtains log data, which may be used to generate the line data, from the log data manager 64. In this example, the log data relating to the device and the user included in the device map being displayed to the user at S23 may be obtained. For example, when the device map shown in FIG. 11 is displayed, the layout diagram generator 50 may obtain the log data indicating one or more jobs being performed by each one of the printers 10x, 10y, 10z, and 10w according to one or more requests received from each one of the users A, B, and C. In this example, the layout diagram generator 50 is assumed to obtain log data indicating the jobs that have been completed. However, the layout diagram generator 50 may additionally obtain log data relating to the jobs to be processed or the jobs being interrupted or cancelled due to an error.

At S28, the layout diagram generator 50 analyzes the log data, and generates line data using the entire or a selected portion of the log data. For example, in order to generate line data to be represented by a line object connecting the printer 10x and the user A, the layout diagram generator 50 analyzes the log data to extract, as the line data, a portion of the log data, which relates to one or more jobs being performed by the printer 10x according to one or more requests received from the user A. At this step, when none of the log data relates to the jobs being performed by the printer 10x according to the requests received from the user A, no line data is generated.

At S29, the layout diagram generator 50 generates the line object connecting each one of the printers and each one of the users shown in the device map, using the line data. For example, the layout diagram generator 50 may generate the line object connecting the printer 10x and the user A, which is to be added to the device map, using the line data generated at S28. At this step, the appearance of the line object may be determined in a corresponding manner with the line data. In one example, the thickness of the line object may be determined according to the amount of usage of the printer 10x by the user A, which may be estimated by the total number of pages being processed by the printer 10x in response to the requests received fro the user A. In another example, the color or pattern of the line object may be determined according to the type of the jobs being performed by the printer 10x in response to the requests received from the user A, such as based on whether the color printing job is performed or the monochrome printing job is performed.

At S30, the layout diagram generator 50 sends information regarding the line object to the webpage generator 40.

At S31, the webpage generator 40 generates webpage data including the device map to which the line object is added and sends the webpage data to the communication controller 31. Alternatively, the webpage generator 40 may send the information regarding the line object to the communicator controller 31, after converting the information regarding the line object into a format suitable to the browser 81.

At S32, the communication controller 31 sends the webpage data or the information regarding the line object to the browser 81 of the client 80 in response to the request for displaying the line object.

Figure 12:
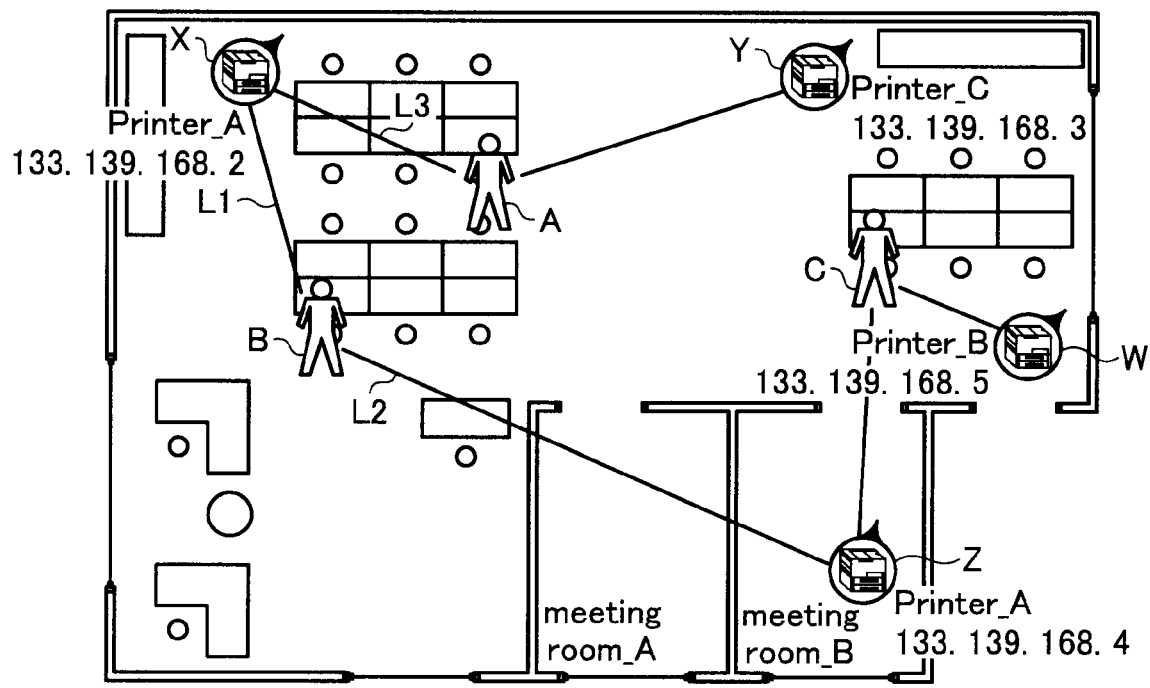
FIG. 12 is an illustration of an example layout diagram to which line data is added as a line object to the layout diagram of FIG. 11.

At S33, the browser 81 displays the webpage data including the device map to which the line object is added. Alternatively, the browser 81 may add the line object to the device map being displayed. For example, the device map shown in FIG. 11 may be switched to the device map shown in FIG. 12. By looking at the line object shown in FIG. 12, the user may instantly know the usage of each device by each user present in the specified area. For example, since the icon B representing the user B is connected respectively to the icon X through a line object L1 and to the icon Z through a line object L2, the user may be informed that the user B has only used the printer 10x and the printer 10z among four printers available in the specified area. In another example, since the icon X representing the printer 10x is connected respectively to the icon B through the line object L1 and to the icon A through a line object L3, the user may be informed that the printer 10x has been only used by the user A and the user B among three users present in the specified area.

The operation of FIG. 8 or 9 may be performed in various other ways. For example, the steps described referring to FIGS. 8 and 9 may be performed at once upon receiving a request for displaying a device map from the user. In such case, the device map shown in FIG. 12 may be displayed to the user in response to the request for displaying the device map. In another example, the line object representing an error detected in the device 10 caused by a request sent by the user may be displayed, in a substantially similar manner as described above referring to FIG. 9. In such case, the layout data is generated using the log data relating to the job in which the error is detected. In another example, the operation of FIG. 9 may be performed differently depending on the type of request received from the user, for example, as described below, referring to any one of FIGS. 13, 18, and 23.

Figure 13:
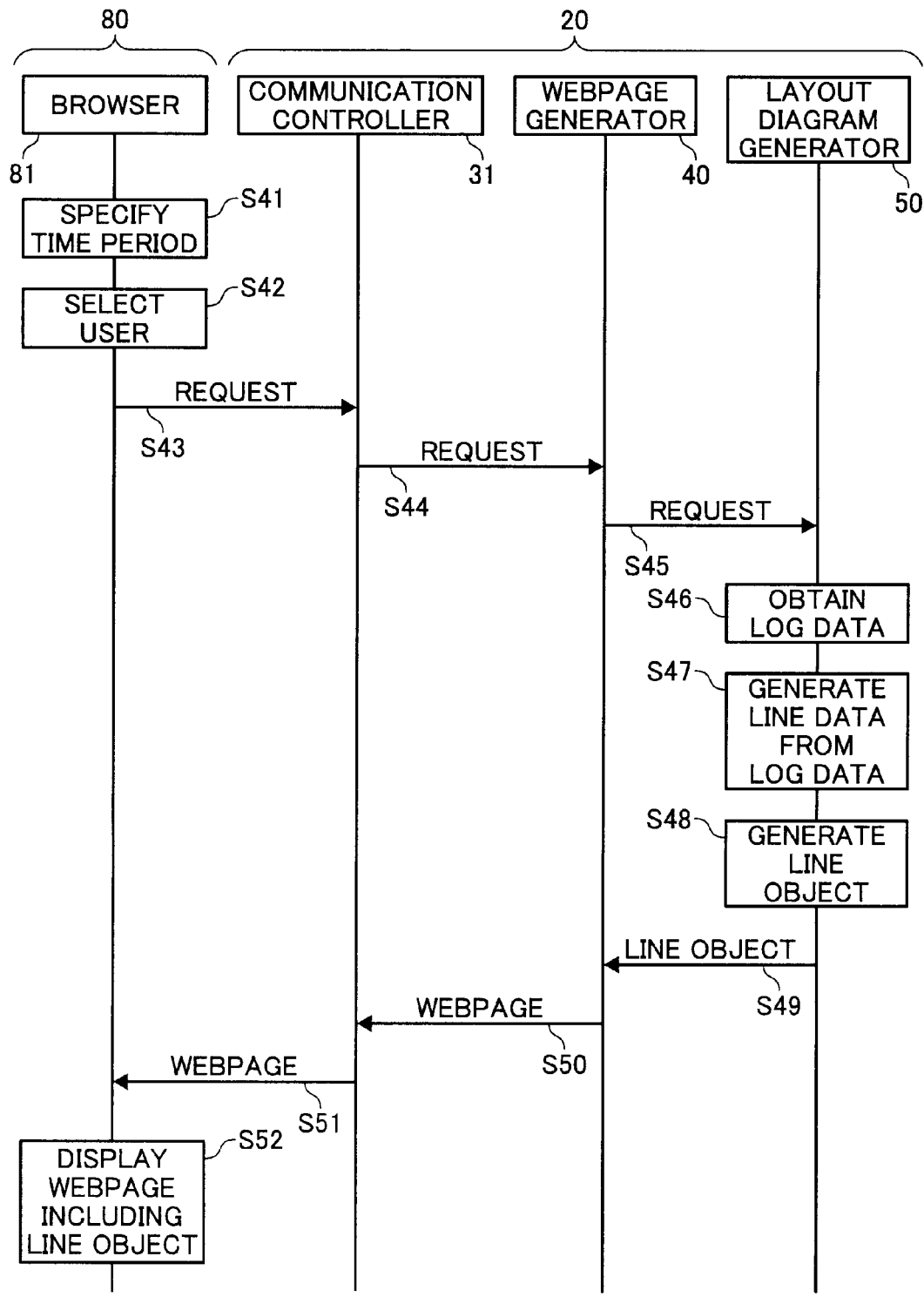
FIG. 13 is a sequence diagram illustrating operation of adding a line object to the layout diagram generated by performing the operation of FIG. 8, according to an example embodiment of the present invention.

Referring now to FIG. 13, operation of adding a line object to the device map, performed by the device management apparatus 20, upon receiving a request from the user through the browser 81, is explained according to an example embodiment of the present invention.

At S41 and S42, the browser 81 may receive a request for displaying a line object that describes the usage of any one of the devices shown in the device map by a selected user for a specified time period. In such case, at S41, the device management apparatus 20 may cause the browser 81 to additionally display a text box, for example, in the form of a pop-up window, which allows the user to input the specified time period using an input device of the client 80, such as a keyboard. For the illustrative purpose, the specified time period is assumed to be set for a time period occurred before the current date and time. Further, at S42, the device management apparatus 20 may cause the browser 81 to display the device map as a geographical user interface (GUI), which allows the user to select any one of the user objects on the device map, for example, by clicking on a selected user object using a input device or pointing device of the client 80, such as a mouse. In this example, one user is selected, however, any number of users may be selected.

Upon receiving information regarding the specified time period and the selected user at S41 and S42, at S43, the browser 81 sends the request for displaying the line object together with the information received at S41 and S42 to the device management apparatus 20.

At S44, the communication controller 31 of the device management apparatus 20 sends the request for obtaining the line object together with the information regarding the specified time period and the selected user to the webpage generator 40.

At S45, the webpage generator 40 sends the request for obtaining the line object together with the information regarding the specified time period and the selected user to the layout diagram generator 50.

Upon receiving the request, at S46, the layout diagram generator 50 obtains log data, which may be used to generate the line data, from the log data manager 64. In this example, the log data relating to the device and the user included in the device map being displayed to the user at S23 of FIG. 8 may be obtained in a substantially similar manner as described above referring to S27 of FIG. 9. In another example, the log data relating to the specified time period specified at S41 and/or the selected user selected at S42 may be obtained.

At S47, the layout diagram generator 50 analyzes the log data, and generates line data using the entire or a selected portion of the log data in a substantially similar manner as described above referring to S28 of FIG. 9. However, in this example, the line data relating to one or more jobs being performed by each one of the printers 10x, 10y, 10z, and 10w according to one or more requests received from the selected user for the specified time period is obtained. When none of the log data relates to the jobs being performed according to the requests received from the selected user for the specified time period, no line data is generated.

At S48, the layout diagram generator 50 generates the line object connecting each one of the printers and the selected user, which is to be added to the device map, using the line data generated at S47. At this step, the appearance of the line object may be determined in a corresponding manner with the line data, for example, in a substantially similar manner as described above referring to S29 of FIG. 9.

At S49, the layout diagram generator 50 sends information regarding the line object to the webpage generator 40.

At S50, the webpage generator 40 generates webpage data including the device map to which the line object is added and sends the webpage data to the communication controller 31. Alternatively, the webpage generator 40 may send the information regarding the line object to the communicator controller 31, after converting the information regarding the line object into a format suitable to the browser 81.

At S51, the communication controller 31 sends the webpage data or the information regarding the line object to the browser 81 of the client 80 in response to the request for displaying the line object.

Figure 14:
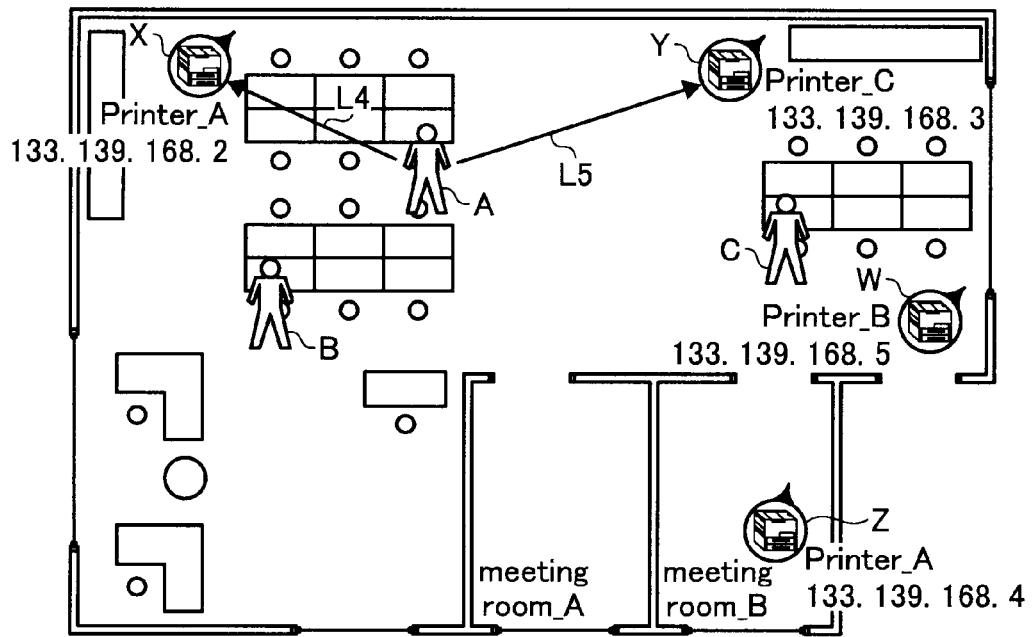
FIG. 14 is an illustration of an example layout diagram to which line data is added as a line object to the layout diagram of FIG. 11.

At S52, the browser 81 displays the webpage data including the device map to which the line object is added. Alternatively, the browser 81 may add the line object to the device map being displayed. For example, the device map shown in FIG. 11 may be switched to the device map shown in FIG. 14, when the user A is selected. By looking at the line object shown in FIG. 14, the user may instantly know the usage of each device by the user A. For example, since the icon A representing the user A is connected respectively to the icon X through a line object L4 and to the icon Y through a line object L5, the user may be informed that the user A has only used the printer 10x and the printer 10y for the specified time period.

Figure 15:
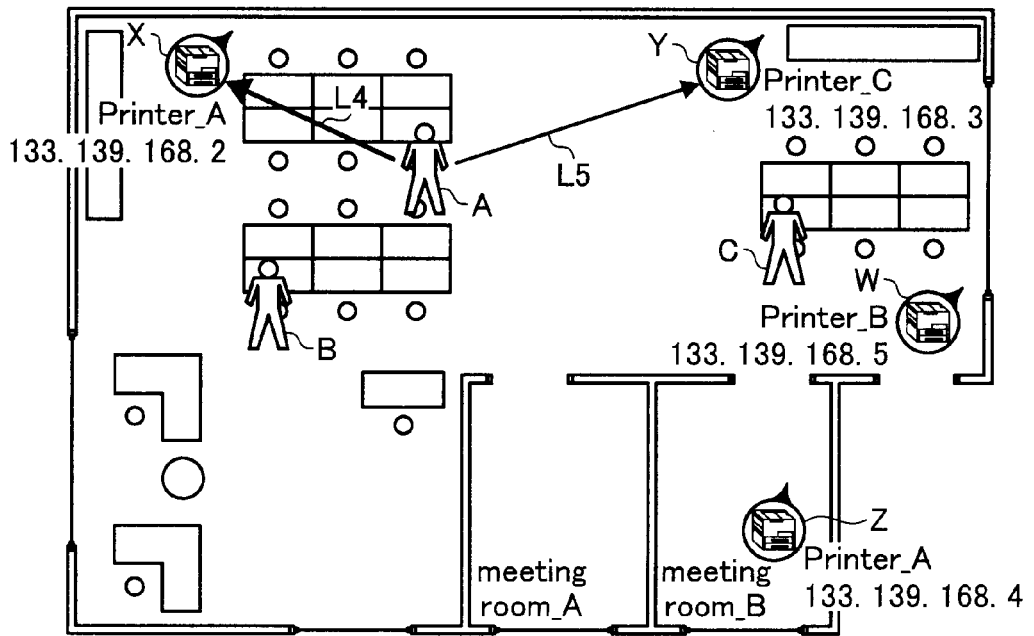
FIG. 15 is an illustration of an example layout diagram to which line data is added as a line object to the layout diagram of FIG. 11.

The operation of FIG. 13 may be performed in various other ways. For example, the layout diagram generator 50 may generate the line object in a corresponding manner with the amount of usage of each printer by the selected user, which may be estimated by the total number of pages being processed by each printer. In this example, the line thickness of the line object is changed according to the total number of pages being processed by each printer, for example, as illustrated in FIG. 15. Referring to FIG. 15, the line object L4 representing one or more jobs being performed by the printer 10x is displayed with a thick line, while the line object L5 representing one or more jobs being performed by the printer 10y is displayed with a thin line. In this manner, by looking at the line object shown in FIG. 15, the user may instantly know that the usage of the printer 10x is greater than the usage of the printer 10y for the selected user A. In alternative to changing the line thickness of the line object, any other appearance, such as the color density, of the line object may be changed.

Figure 16:
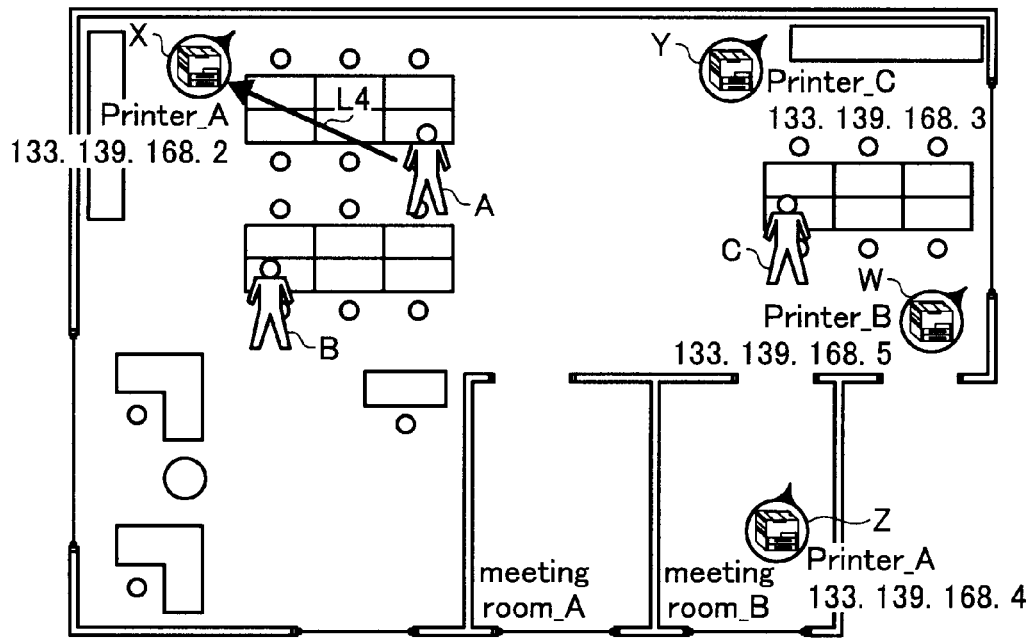
FIG. 16 is an illustration of an example layout diagram to which line data is added as a line object to the layout diagram of FIG. 11.

In another example, the layout diagram generator 50 may analyze the log data to identify one of the printers that has performed the greatest number of jobs according to the requests received from the selected user for the specified time period. Once the printer that the selected user uses most ("mostly used printer") is identified, the layout diagram generator 50 may extract a portion of the log data to obtain the line data relating to one or more jobs being performed by the mostly used printer, and generate the line object representing the one or more jobs being performed by the mostly used printer based on the line data. In such case, the line object connecting the selected user and the mostly used printer is displayed, for example, as illustrated in FIG. 16. In this manner, by looking at the line object shown in FIG. 16, the user may instantly know that which one of the printers is mostly used by the selected user among the printers available for use. Specifically, in this example shown in FIG. 16, by looking at the line object L4 connecting the printer 10x and the user A, the user may instantly know that the printer 10x is mostly used by the user A.

Figure 17:
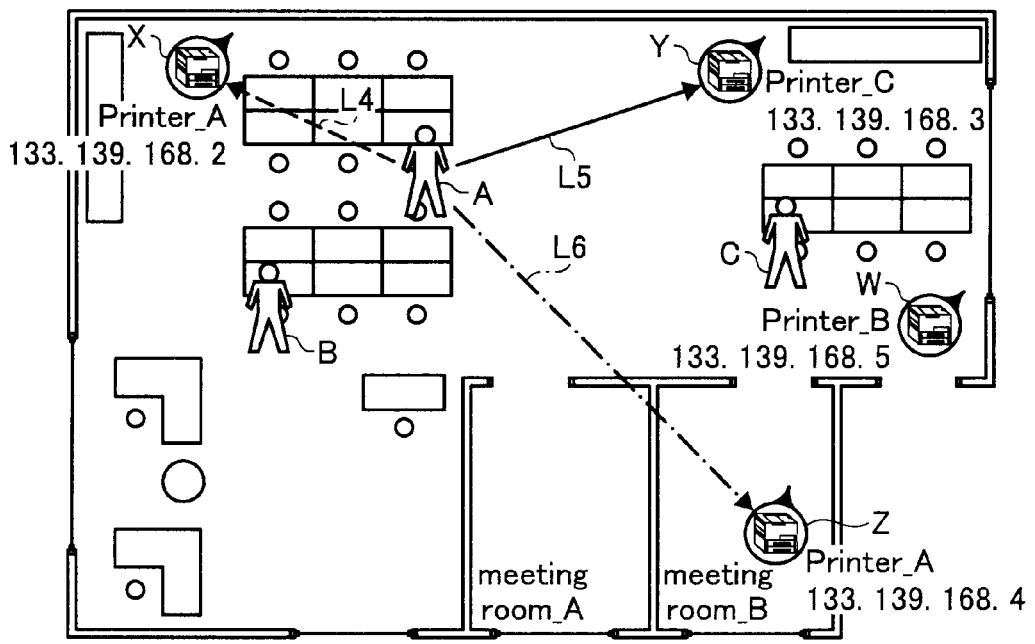
FIG. 17 is an illustration of an example layout diagram to which line data is added as a line object to the layout diagram of FIG. 11.

In another example, the layout diagram generator 50 may generate the line object in a corresponding manner with the type of jobs being performed by each printer according to a request from the selected user for the specified time period. In this example, the pattern of the line object is changed according to whether the color printing is performed or the monochrome printing is performed, for example, as illustrated in FIG. 17. Referring to FIG. 17, the line object L4 representing one or more jobs being performed by the printer 10x is displayed with a dashed line corresponding to the color printing. The line object L5 representing one or more jobs being performed by the printer 10y is displayed with a solid line corresponding to the monochrome printing. The line object L6 representing one or more jobs being performed by the printer 10z is displayed with a dash-single-dot line corresponding to both the color and monochrome printing. In this manner, by looking at the line object L4, the user may instantly know that the usage of the printer 10x by the user A is limited to the color printing job. By looking at the line object L5, the user may instantly know that the usage of the printer 10y by the user A is limited to the monochrome printing job. In alternative to changing the color of the line object, any other appearance, such as the color, of the line object may be changed according to the type of jobs being performed. Alternatively, the appearance of the line object may be changed according to the ratio between the monochrome printing and the color printing. In the example case of the printer 10z shown in FIG. 17, when the monochrome printing jobs being performed by the printer 10z are greater in number than the color printing jobs being performed by the printer 10z, the line object L6 may be displayed with the standard line representing the monochrome printing.

In another example, the appearance of the line object may be changed according to whether the job is successfully performed or not. In such case, the layout diagram generator 50 may analyze the log data to identify one or more jobs that have been interrupted or cancelled due to an error according to the requests received from the selected user for the specified time period. Once the error jobs are identified, the layout diagram generator 50 may generate line data relating to the error jobs, and add the line data to the layout diagram as a line object. By looking at the line object, the user may instantly know that which one of the printers has caused an error for the specified time period.

In another example, the specified time period may be set after the current date and time. In such case, by looking at the line object representing the line data indicating one or more jobs to be processed, the user may instantly know whether any one the printers has backlog of jobs or which one of the printers has a greatest number of jobs to be processed.

Figure 18:
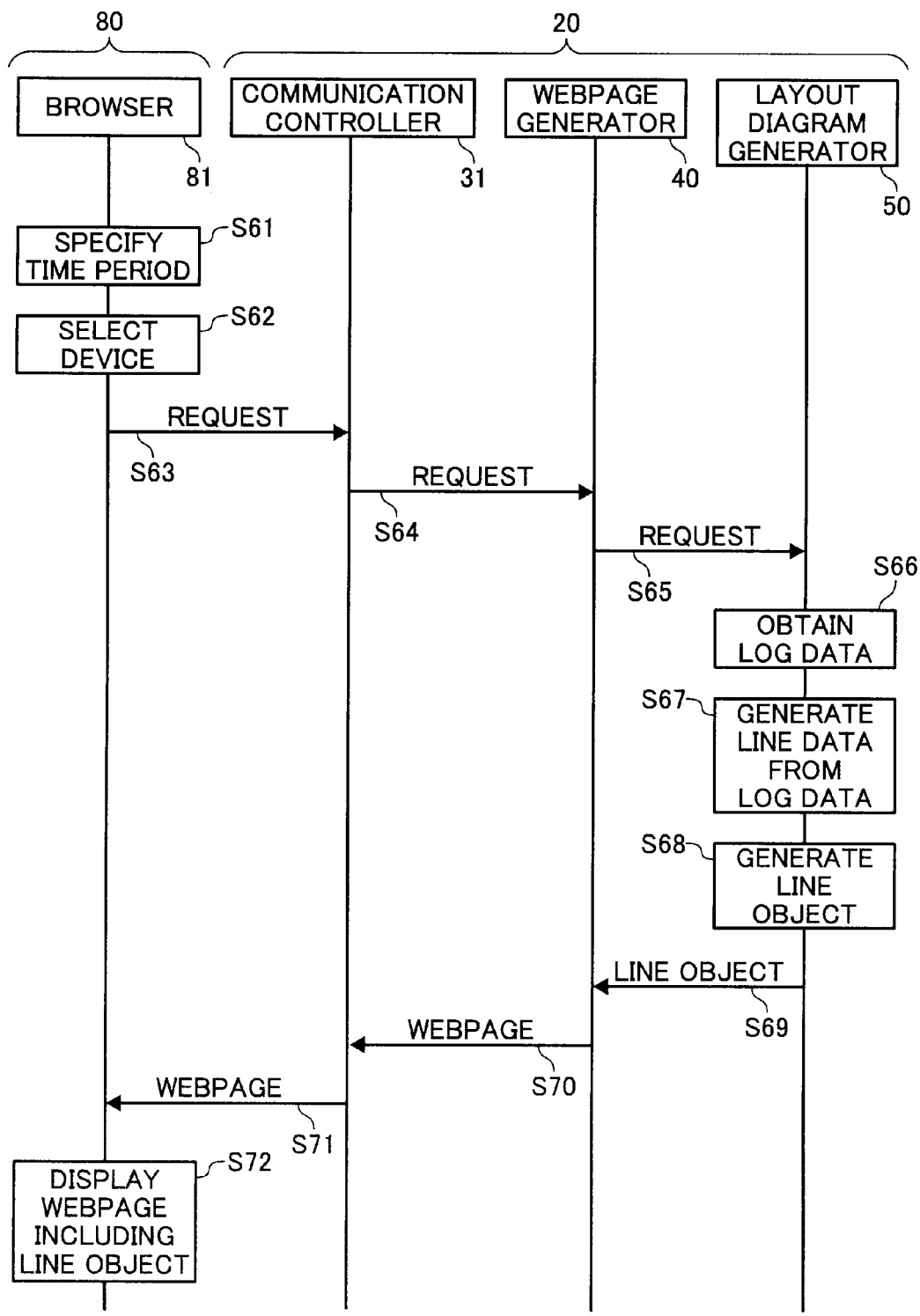
FIG. 18 is a sequence diagram illustrating operation of adding a line object to the layout diagram generated by performing the operation of FIG. 8, according to an example embodiment of the present invention.

Referring now to FIG. 18, operation of adding a line object to the device map, performed by the device management apparatus 20, upon receiving a request from the user through the browser 81, is explained according to an example embodiment of the present invention.

At S61 and S62, the browser 81 may receive a request for displaying a line object that describes the usage of a selected device by any one of the users shown in the device map for a specified time period. In such case, at S61, the device management apparatus 20 may cause the browser 81 to additionally display a text box, for example, in the form of a pop-up window, which allows the user to input the specified time period using an input device of the client 80, such as a keyboard. For the illustrative purpose, the specified time period is assumed to be set for a time period occurred before the current date and time. Further, at S62, the device management apparatus 20 may cause the browser 81 to display the device map as a geographical user interface (GUI), which allows the user to select any one of the device objects on the device map, for example, by clicking on a selected device object using an input device or a pointing device of the client 80, such as a mouse. In this example, one device is selected, however, any number of devices may be selected.

Upon receiving information regarding the specified time period and the selected device at S61 and S62, at S63, the browser 81 sends the request for displaying the line object together with the information received at S61 and S62 to the device management apparatus 20.

At S64, the communication controller 31 of the device management apparatus 20 sends the request for obtaining the line object together with the information regarding the specified time period and the selected device to the webpage generator 40.

At S65, the webpage generator 40 sends the request for obtaining the line object together with the information regarding the specified time period and the selected device to the layout diagram generator 50.

Upon receiving the request, at S66, the layout diagram generator 50 obtains log data, which may be used to generate the line data, from the log data manager 64. In this example, the log data relating to the device and the user included in the device map being displayed to the user at S23 of FIG. 8 may be obtained in a substantially similar manner as described above referring to S27 of FIG. 9. In another example, the log data relating to the specified time period specified at S61 and/or the selected device selected at S62 may be obtained.

At S67, the layout diagram generator 50 analyzes the log data, and generates line data using the entire or a selected portion of the log data in a substantially similar manner as described above referring to S28 of FIG. 9. However, in this example, the line data relating to one or more jobs being performed by the selected printer according to one or more requests received from each one of the users for the specified time period is obtained. When none of the log data relates to the jobs being performed by the selected device for the specified time period, no line data is generated.

At S68, the layout diagram generator 50 generates the line object connecting the selected printer and each one of the users, which is to be added to the device map, using the line data. At this step, the appearance of the line object may be determined in a corresponding manner with the line data, for example, in a substantially similar manner as described above referring to S29 of FIG. 9.

At S69, the layout diagram generator 50 sends information regarding the line object to the webpage generator 40.

At S70, the webpage generator 40 generates webpage data including the device map to which the line object is added and sends the webpage data to the communication controller 31. Alternatively, the webpage generator 40 may send the information regarding the line object to the communicator controller 31, after converting the information regarding the line object into a format suitable to the browser 81.

At S71, the communication controller 31 sends the webpage data or the information regarding the line object to the browser 81 of the client 80 in response to the request for displaying the line object.

Figure 19:
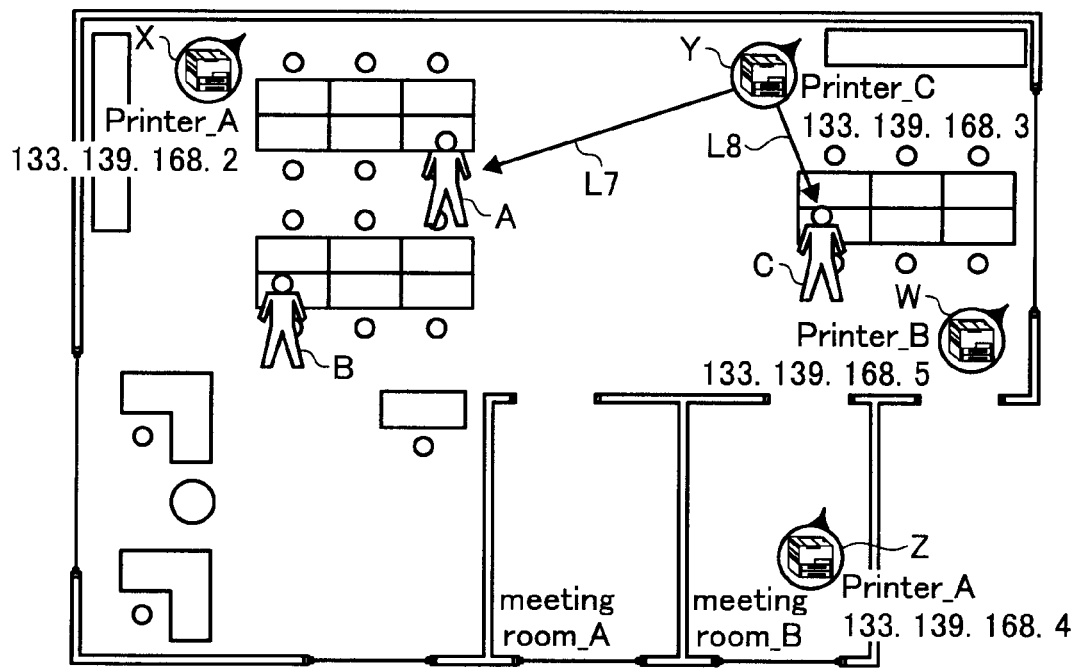
FIG. 19 is an illustration of an example layout diagram to which line data is added as a line object to the layout diagram of FIG. 11.

At S72, the browser 81 displays the webpage data including the device map to which the line object is added. Alternatively, the browser 81 may add the line object to the device map being displayed. For example, the device map shown in FIG. 11 may be switched to the device map shown in FIG. 19, when the printer 10y is selected. By looking at the line object shown in FIG. 19, the user may instantly know the usage of the printer 10y by each user. For example, since the icon Y representing the printer 10y is connected respectively to the icon A through a line object L7 and to the icon C through a line object L8, the user may be informed that the printer 10y has been only used by the user A and the user C for the specified time period.

Figure 20:
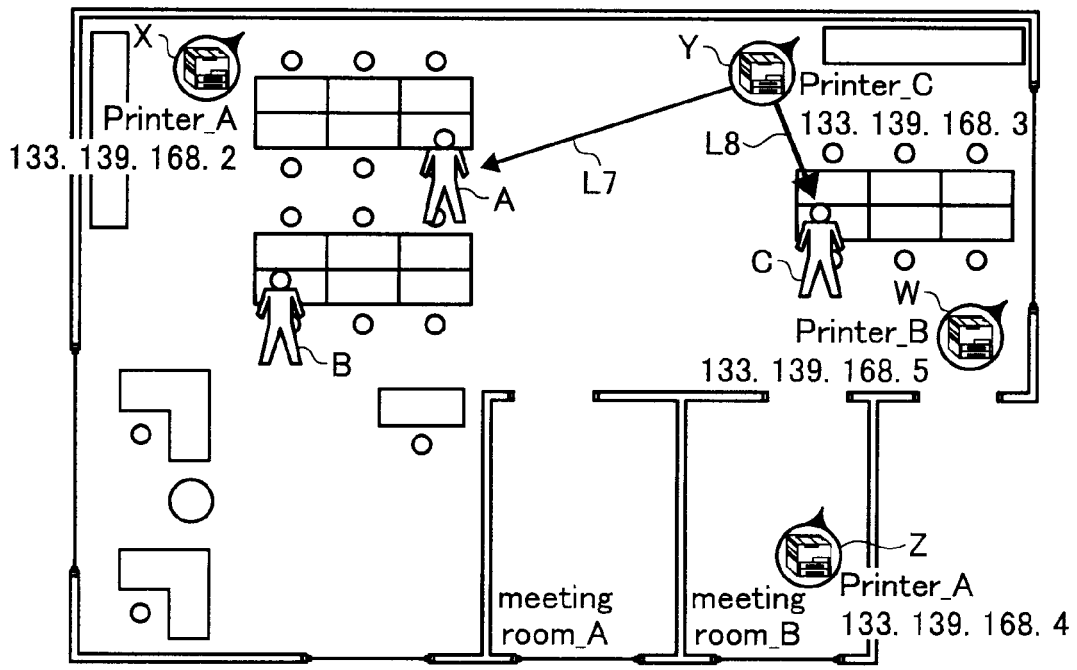
FIG. 20 is an illustration of an example layout diagram to which line data is added as a line object to the layout diagram of FIG. 11.

The operation of FIG. 18 may be performed in various other ways. For example, the layout diagram generator 50 may generate the line object in a corresponding manner with the amount of usage of the selected printer by each user, which may be estimated by the total number of pages being processed by the selected printer according to the requests received from each user, or the total number of job requests being received by the selected printer from each user. In this example, the line thickness of the line object is changed according to the total number of pages being processed by the selected printer in response to the requests received by each user, for example, as illustrated in FIG. 20. Referring to FIG. 20, the line object L8 representing one or more jobs being performed by the printer 10y in response to the requests received from the user C is displayed with a thick line, while the line object L7 representing one or more jobs being performed by the printer 10y in response to the requests received from the user A is displayed with a thin line. In this manner, by looking at the line object shown in FIG. 20, the user may instantly know that the usage of the printer 10y by the user C is greater than the usage of the printer 10y by the user A. In alternative to changing the line thickness of the line object, any other appearance, such as the color density, of the line object may be changed.

Figure 21:
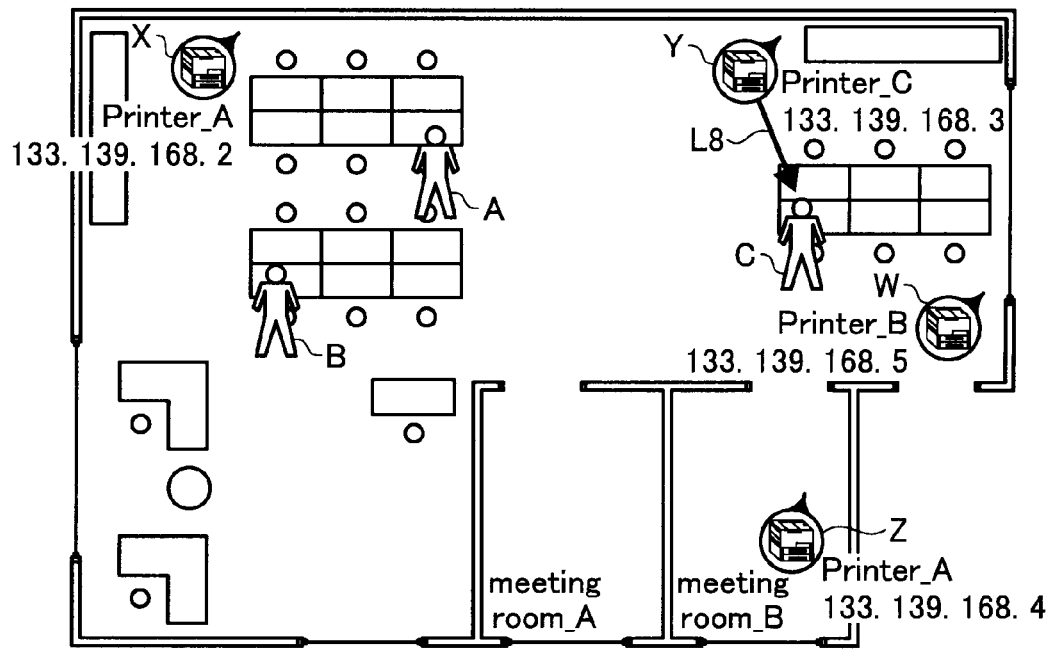
FIG. 21 is an illustration of an example layout diagram to which line data is added as a line object to the layout diagram of FIG. 11.

In another example, the layout diagram generator 50 may analyze the log data to identify one of the users who has requested the selected printer to perform the greatest number of jobs for the specified time period. Once the user using the selected printer ("frequent user") is identified, the layout diagram generator 50 may extract a portion of the log data to obtain the line data relating to one or more jobs being requested by the frequent user, and generate the line object representing the one or more jobs being requested by the frequent user based on the line data. In such case, the line object connecting the selected printer and the frequent user is displayed, for example, as illustrated in FIG. 21. In this manner, by looking at the line object shown in FIG. 21, the user may instantly know that who mostly uses the selected printer among the users present in the selected area. Specifically, in this example shown in FIG. 21, by looking at the line object L8 connecting the printer 10y and the user C, the user may instantly know that the user C mostly uses the printer 10y.

Figure 22:
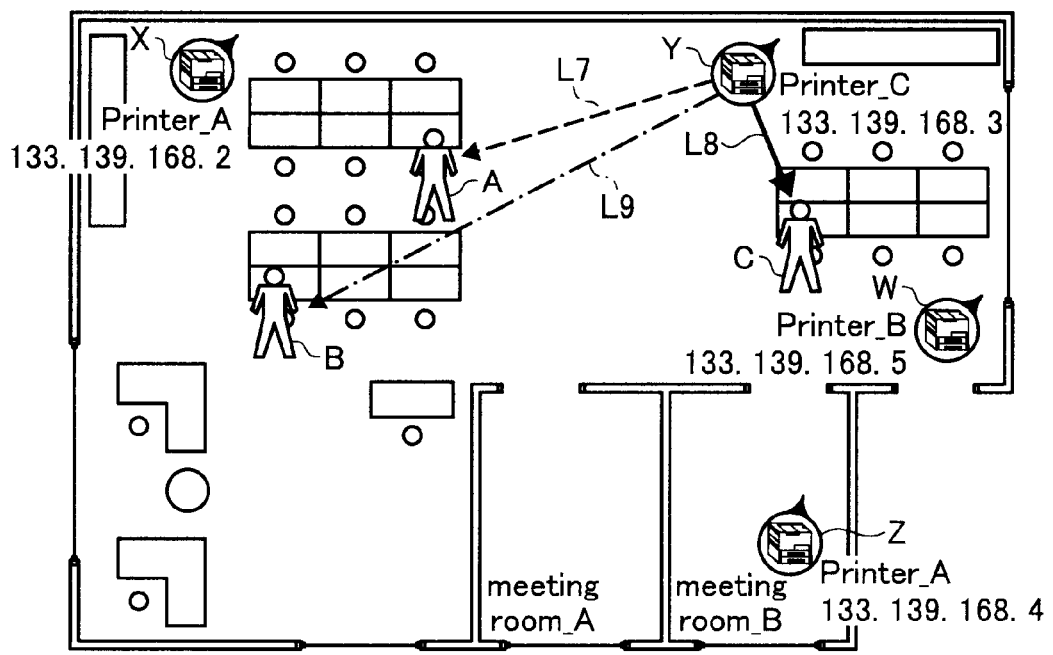
FIG. 22 is an illustration of an example layout diagram to which line data is added as a line object to the layout diagram of FIG. 11.

In another example, the layout diagram generator 50 may generate the line object in a corresponding manner with the type of jobs being performed by the selected printer according to a request from one or more users for the specified time period. In this example, the pattern of the line object is changed according to whether the color printing is performed or the monochrome printing is performed, for example, as illustrated in FIG. 22. Referring to FIG. 22, the line object L7 representing one or more jobs being requested by the user A is displayed with a dashed line corresponding to the color printing. The line object L8 representing one or more jobs being requested by the user C is displayed with a solid line corresponding to the monochrome printing. The line object L9 representing one or more jobs being requested by the user B is displayed with a dash-single-dot line corresponding to both the color and monochrome printing. In this manner, by looking at the line object L7, the user may instantly know that the usage of the printer 10y by the user A is limited to the color printing job. By looking at the line object L8, the user may instantly know that the usage of the printer 10y by the user C is limited to the monochrome printing job. In alternative to changing the color of the line object, any other appearance, such as the color, of the line object may be changed according to the type of jobs being performed. Alternatively, the appearance of the line object may be changed according to the ratio between the monochrome printing and the color printing. In the example case of the user B shown in FIG. 22, when the monochrome printing jobs being requested by the user B are greater in number than the color printing jobs being requested by the user B, the line object L9 may be displayed with the standard line representing the monochrome printing.

In another example, the appearance of the line object may be changed according to whether the job is successfully performed or not. In such case, the layout diagram generator 50 may analyze the log data to identify one or more jobs performed by the selected printer that have been interrupted or cancelled due to an error according to the requests received from each user for the specified time period. Once the error jobs are identified, the layout diagram generator 50 may generate line data relating to the error jobs, and add the line data to the layout diagram as a line object. By looking at the line object, the user may instantly know that which one of the users has caused an error for the specified time period.

In another example, the specified time period may be set after the current date and time. In such case, by looking at the line object representing the line data indicating one or more jobs to be processed, the user may instantly know whether the selected printer has backlog of jobs.

Figure 23:
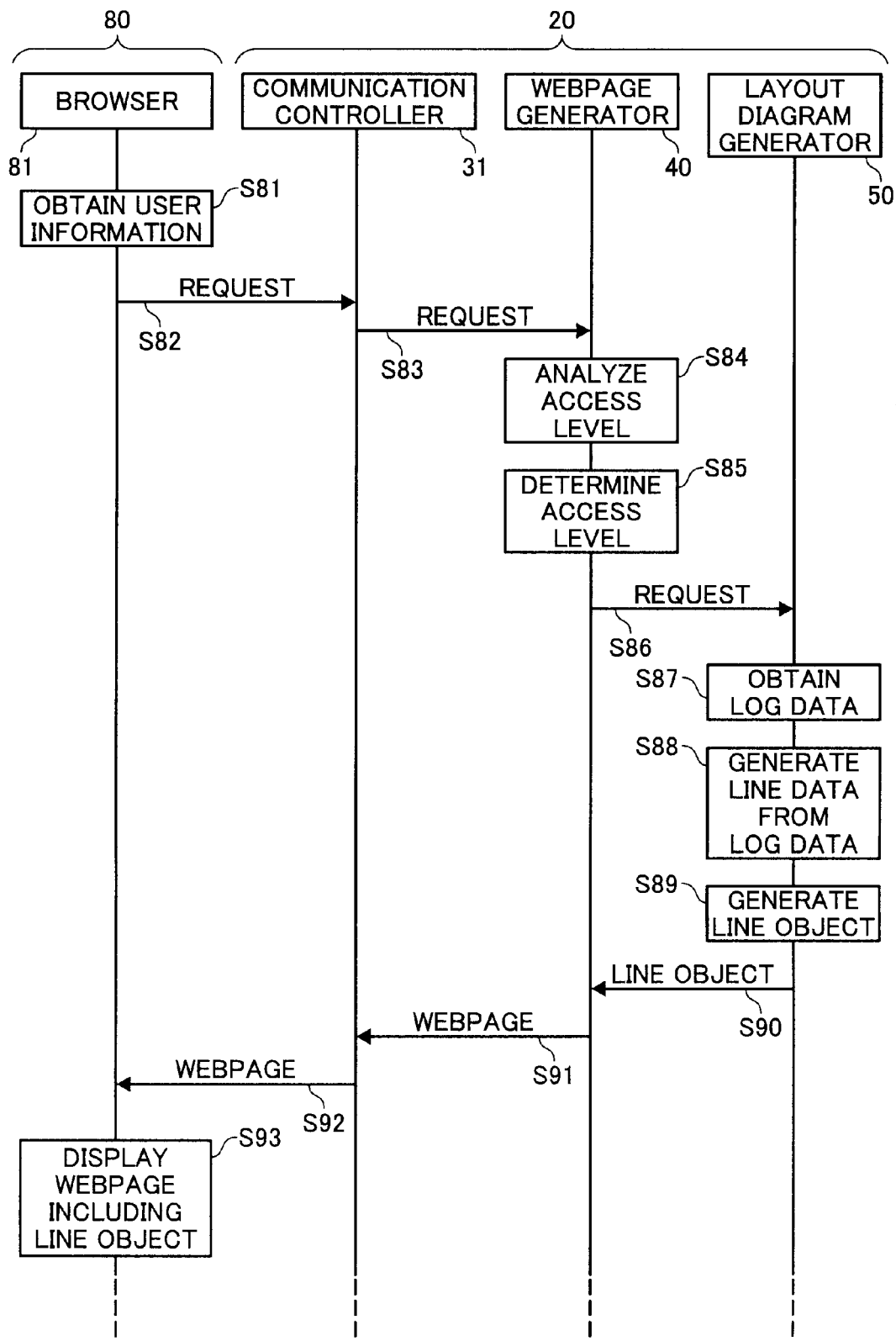
FIG. 23 is a sequence diagram illustrating operation of adding a line object to the layout diagram generated by performing the operation of FIG. 8, according to an example embodiment of the present invention.

Referring now to FIG. 23, operation of adding a line object to the device map, performed by the device management apparatus 20, upon receiving a request from the user through the browser 81, is explained according to an example embodiment of the present invention.

At S81, when or before detecting a request for displaying a line object, the browser 81 may request the user to input user information, such as the user name and the user password, to be used for authentication. Alternatively, the browser 81 may automatically read the user information from a recording medium storing the user information, if such recording medium is available.

At S82, the browser 81 sends the request for displaying the line object to the device management apparatus 20 together with the user information.

At S83, the communication controller 31 of the device management apparatus 20 sends the request for obtaining the line object together with the user information to the webpage generator 40.

At S84, the access level analyzer 41 of the webpage generator 40 analyzes an access level of the user by checking the user data managed by the user data manager 63. In this example, the access level analyzer 41 determines whether the user belongs to a general user group or an administrator group to generate a determination result by checking the access level information that corresponds to the user information.

At S85, the webpage generator 40 determines the access level of the user based on the determination result. Specifically, in this example, when the determination result indicates that the user belongs to the general user group, the user is assigned with a lower access level that allows the user to access only to the log data relating to the user. When the determination result indicates that the user belongs to the administrator group, the user is assigned with a high access level that allows the user to access all log data.

At S86, the webpage generator 40 sends the request for obtaining the line object together with information regarding the access level obtained at S85.

Upon receiving the request, at S87, the layout diagram generator 50 obtains log data, which may be used to generate the line data, from the log data manager 64. In this example, the log data relating to the device and the user included in the device map being displayed to the user at S23 of FIG. 8 may be obtained in a substantially similar manner as described above referring to S27 of FIG. 9, for example, when the user is assigned with the high access level. In another example, only the log data relating to the user may be obtained when the user is assigned with the low access level.

At S88, the layout diagram generator 50 analyzes the log data, and generates line data using the entire or a selected portion of the log data, for example, in a substantially similar manner as described above referring to S28 of FIG. 9. However, in this example, when the user is assigned with the low access level, the line data relating to one or more jobs being performed by each one of the printers 10x, 10y, 10z, and 10y according to one or more requests received from the user is obtained. When none of the log data relates to the jobs being performed according to the requests received from the user, no line data is generated.

At S89, the layout diagram generator 50 generates the line object, which is to be added to the device map, using the line data. When the user is assigned with the high access level, the line object connecting each one of the printers and each one of the users may be displayed. When the user is assigned with the low access level, the line object connecting each one of the printers and the user may be displayed. At this step, the appearance of the line object may be determined in a corresponding manner with the line data, for example, in a substantially similar manner as described above referring to S29 of FIG. 9.

At S90, the layout diagram generator 50 sends information regarding the line object to the webpage generator 40.

At S91, the webpage generator 40 generates webpage data including the device map to which the line object is added and sends the webpage data to the communication controller 31. Alternatively, the webpage generator 40 may send the information regarding the line object to the communicator controller 31, after converting the information regarding the line object into a format suitable to the browser 81.

At S92, the communication controller 31 sends the webpage data or the information regarding the line object to the browser 81 of the client 80 in response to the request for displaying the line object.

Figure 24:
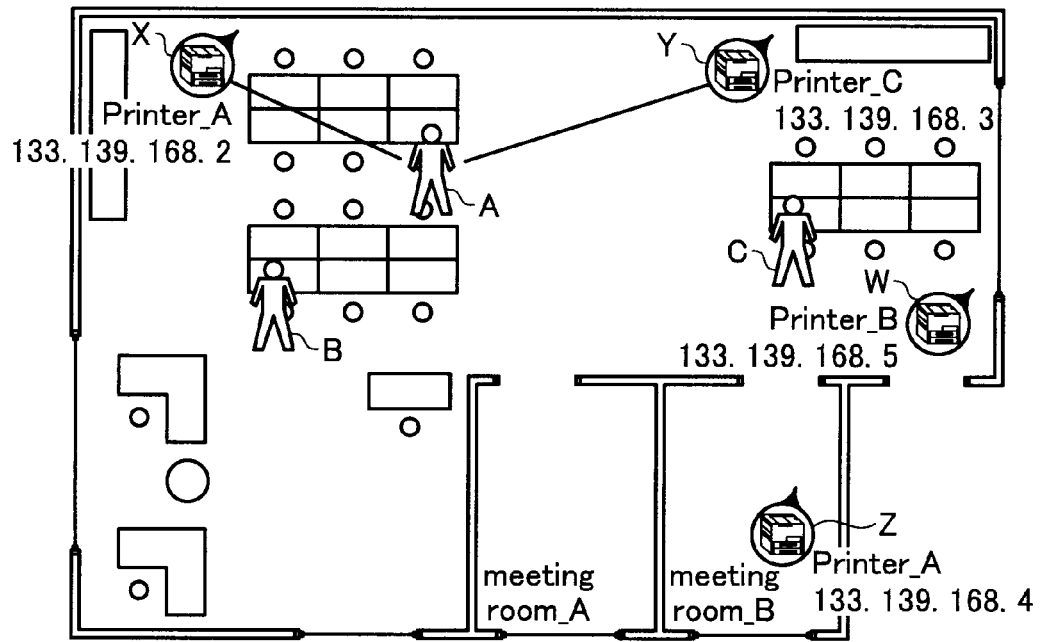
FIG. 24 is an illustration of an example layout diagram to which line data is added as a line object to the layout diagram of FIG. 11.

At S93, the browser 81 displays the webpage data including the device map to which the line object is added. Alternatively, the browser 81 may add the line object to the device map being displayed. In one example, the device map shown in FIG. 11 may be switched to the device map shown in FIG. 24, when the user A assigned with the low access level is logged on. By looking at the line object shown in FIG. 24, the user A may instantly know the usage of each device by the user A. However, the user A is prohibited from viewing any other information relating to the other users.

Figure 25:
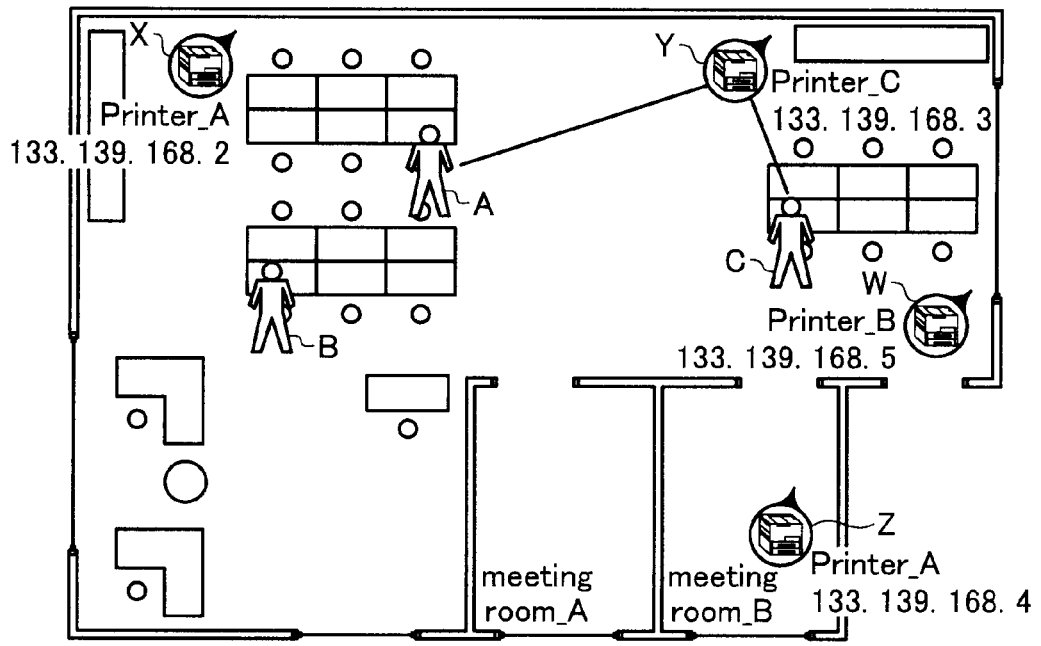
FIG. 25 is an illustration of an example layout diagram to which line data is added as a line object to the layout diagram of FIG. 11.

The operation of FIG. 23 may be performed in various other ways. For example, in alternative to prohibiting the general user from viewing information relating to the other users, the general user may be prohibited from viewing information regarding the devices other than the device that the general user is authorized to use. For example, when the general user A is authorized to use only the printer 10y shown in FIG. 11, the device management apparatus 20 may switch from the device map shown in FIG. 11 to the device map shown in FIG. 25. By looking at the line object shown in FIG. 25, the user A may instantly know the usage of the printer 10y by any one of the users. However, the user A is prohibited from viewing any other information relating to the other devices that the user A does not have authorization to use. In another example, the general user may be prohibited from viewing information regarding the other users and the unauthorized devices. In such case, the device management apparatus 20 causes the browser 81 to display only the line object indicating one or more jobs performed by the device that the general user is authorized to use according to one or more requests sent from the general user. Alternatively, the type of information to prohibit a selected user group from viewing may be determined in various other ways.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

In another example, the device 10 to be managed by the device management apparatus 20 may not be limited to any one of the devices 10a to 10e shown in FIG. 1, as long as the device 10 is capable of providing log data to the device management apparatus 20. The examples of the device 10 may include, but not limited to, a home appliance device, vending machine, medical equipment, power supply device, air conditioner, meter such as a gas meter, automobile, and aircraft. In such case, the amount of jobs being performed or to be performed may be expressed in any desired unit.

In another example, the client 80 provided at the user site may not be limited to the PC 80a or 80b shown in FIG. 1, as long as the client 80 is capable of outputting a layout diagram to which a line object is added. The examples of the client 80 may include, but not limited to, a personal digital assistant (PDA), and portable device such as a portable phone or camera provided with a user interface.

Further, in addition to cause the client 80 to display the layout diagram, the device management apparatus 20 may cause the client 80 to print the layout diagram. Alternatively, the device management apparatus 20 may send the webpage data to an email address of the user, which may be obtained from the user data.

Further, as described above, any one of the above-described and other methods of the present invention may be embodied in the form of a computer program stored in any kind of storage medium. Examples of storage mediums include, but are not limited to, flexible disk, hard disk, optical discs such as CD-ROM, magneto-optical discs, magnetic tapes, semiconductor memory such as SRAM, involatile memory such as EEPROM or involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. A layout diagram generating apparatus, comprising:
a data obtaining unit configured to obtain data, the data including layout data relating to layout of a user and a device and log data relating to a job performed by or to be performed by the device;
a layout diagram generating unit configured to generate a layout diagram illustrating the layout of the user and the device based on the layout data, the layout diagram including a user object representing the user and a device object representing the device;
a line data generating unit configured to generate line data based on the log data, the line data to be additionally included in the layout diagram as a line object connecting the user object and the device object; and
an analyzing unit configured to analyze an access level of a logged user, wherein
the line data to be additionally included in the layout diagram as the line object is determined according to the access level of the logged user, and
each of the above units is implemented as hardware or as a hardware/software combination.

2. The apparatus of claim 1, further comprising:
a user interface configured to cause the layout diagram to be displayed to the logged user and receive a user input from the logged user for selecting at least one of the user object and the device object included in the layout diagram as a selected user and a selected device,
wherein the line data being generated includes information regarding a job being performed or to be performed by the device according to a request received from the selected user when the user input selects the user object as the selected user, and wherein the line data being generated includes information regarding the user requesting the selected device to perform a job when the user input selects the device object as the selected device.

3. The apparatus of claim 2, wherein appearance of the line object is determined in a corresponding manner with the log data being used for generating the line data.

4. The apparatus of claim 1, wherein the device comprises an image processing apparatus.

5. A method of providing log data through a layout diagram, the method comprising:
obtaining layout data relating to layout of a user and a device;

generating the layout diagram illustrating the layout of the user and the device based on the layout data, the layout diagram including a user object representing the user and a device object representing the device;

obtaining the log data relating to usage of the device by the user;

generating line data using a selected portion of the log data, the line data to be additionally included in the layout diagram as a line object connecting the user object and the device object; and analyzing an access level of a logged user, wherein the line data to be additionally included in the layout diagram as the line object is determined according to the access level of the logged user.

6. The method of claim 5, wherein the user is among a plurality of users and the device is among a plurality of devices, the method further comprising:

defining a selected user being selected from the plurality of users through the layout diagram; and analyzing the log data to determine the selected portion of the log data, wherein the selected portion of the log data includes information regarding one or more jobs being performed or to be performed by at least one of the plurality of devices according to one or more requests received from the selected user.

7. The method of claim 6, further comprising:

defining a specified time period, wherein the one or more jobs are performed or to be performed for the specified time period.

8. The method of claim 6, wherein at least one of the plurality of devices is a device having a greatest number of jobs being performed according to the request received from the selected user.

9. The method of claim 5, wherein the user is among a plurality of users and the device is among a plurality of devices, the method further comprising:

defining a selected device being selected from the plurality of devices through the layout diagram; and analyzing the log data to determine the selected portion of the log data, wherein the selected portion of the log data includes information regarding one or more jobs being performed or to be performed by the selected device according to one or more requests received from at least one of the plurality of users.

10. The method of claim 9, further comprising:

defining a specified time period, wherein the one or more jobs are performed or to be performed for the specified time period.

11. The method of claim 9, wherein at least one of the plurality of users is a user who has requested the selected device to perform a greatest number of jobs.

12. The method of claim 5, wherein appearance of the line object is determined in a corresponding manner with characteristics of the selected portion of the log data.

13. The method of claim 12, wherein the characteristics of the selected portion of the log data includes a type of one or more jobs being performed or to be performed by the device according to one or more requests received from the user.

14. A computer readable recording medium including a plurality of computer program instructions, which cause a computer to execute a method of providing log data through a layout diagram, the method comprising:

obtaining layout data relating to layout of a user and a device;

generating the layout diagram illustrating the layout of the user and the device based on the layout data, the layout diagram including a user object representing the user and a device object representing the device;

obtaining the log data relating to usage of the device by the user;

generating line data using a selected portion of the log data, the line data to be additionally included in the layout diagram as a line object connecting the user object and the device object; and analyzing an access level of a logged user, wherein the line data to be additionally included in the layout diagram as the line object is determined according to the access level of the logged user.

15. The medium of claim 14, wherein the user is among a plurality of users and the device is among a plurality of devices, the method further comprising:

defining at least one of a selected user being selected from the plurality of users and a selected device being selected from the plurality of users through the layout diagram; and analyzing the log data to determine the selected portion of the log data, wherein the selected portion of the log data includes information regarding one or more jobs being performed or to be performed by at least one of the plurality of devices according to one or more requests received from the selected user when the selected user is defined, and wherein the selected portion of the log data includes information regarding one or more jobs being performed or to be performed by the selected device according to one or more requests received from at least one of the plurality of users when the selected device is defined.

16. The medium of claim 15, wherein the method further comprising:

defining a specified time period, wherein the one or more jobs are performed or to be performed for the specified time period.

17. The medium of claim 14, wherein appearance of the line object is determined in a corresponding manner with characteristics of the selected portion of the log data.

* * * * *